US012696235B2

(12) United States Patent
Pan et al.

(10) Patent No.: US 12,696,235 B2
(45) Date of Patent: Jul. 28, 2026

(54) WIRELESS COMMUNICATION OF POSITIONING THROUGH SIDELINK

(71) Applicant: ZTE Corporation, Shenzhen (CN)

(72) Inventors: Yu Pan, Shenzhen (CN); Chuangxin Jiang, Shenzhen (CN); Weiqiang Du, Shenzhen (CN); Junpeng Lou, Shenzhen (CN); Weimin Xing, Shenzhen (CN); Jing Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 264 days.

(21) Appl. No.: 18/680,830

(22) Filed: May 31, 2024

(65) Prior Publication Data

US 2024/0323910 A1 Sep. 26, 2024

Related U.S. Application Data

(63) Continuation of application No. PCT/CN2022/087151, filed on Apr. 15, 2022.

(51) Int. Cl.
*H04W 64/00* (2009.01)
*H04W 92/18* (2009.01)

(52) U.S. Cl.
CPC .......... *H04W 64/006* (2013.01); *H04W 92/18* (2013.01)

(58) Field of Classification Search
CPC ... H04W 64/006; H04W 92/18; H04W 64/00; H04W 24/08; H04W 24/10; H04W 72/25; H04L 5/005; H04L 5/0053; H04L 5/0069; H04L 5/0094; H04L 5/0048

USPC ....................................................... 455/456.2
See application file for complete search history.

(56) References Cited

U.S. PATENT DOCUMENTS

| | | | | |
|---|---|---|---|---|
| 2005/0255857 | A1* | 11/2005 | Kim ........................ | H04W 8/10 |
| | | | | 455/432.1 |
| 2019/0230618 | A1* | 7/2019 | Saur .................... | H04W 56/001 |
| 2021/0297206 | A1 | 9/2021 | Manolakos et al. | |
| 2021/0409937 | A1 | 12/2021 | Kuo | |

(Continued)

FOREIGN PATENT DOCUMENTS

| | | |
|---|---|---|
| CA | 3186670 A1 | 2/2022 |
| CN | 111247852 A | 6/2020 |

(Continued)

OTHER PUBLICATIONS

China National Property Association Notification to Complete Formalities of Registration and Decision to Grant Patent with English translation regarding Application No. 202411928053X dated Oct. 31, 2025, 11 pages.

(Continued)

*Primary Examiner* — Don N Vo
(74) *Attorney, Agent, or Firm* — Crowell & Moring LLP

(57) ABSTRACT

Sidelink communications may be used for positioning between devices. The sidelink based communications may be between equipment ("UE") and/or with other network nodes, such as a basestation. The sidelink positioning information may be used for location determination. This may include vehicle to everything (V2X) communications via a PC5 interface. The sidelink positioning information is communicated via the PC5 interface and includes location, capability, assistance data, and measurement reports.

20 Claims, 19 Drawing Sheets

(56) References Cited

U.S. PATENT DOCUMENTS

| | | | | |
|---|---|---|---|---|
| 2022/0015059 | A1 | 1/2022 | Tenny | |
| 2022/0321293 | A1* | 10/2022 | Ren | H04L 5/00 |
| 2024/0205738 | A1* | 6/2024 | Shilov | H04W 4/70 |
| 2024/0397472 | A1* | 11/2024 | Li | G01S 5/0009 |

FOREIGN PATENT DOCUMENTS

| | | | |
|---|---|---|---|
| CN | 114007185 | A1 | 2/2022 |
| CN | 114208308 | A | 3/2022 |
| CN | 115280860 | A | 11/2022 |
| WO | WO2021027861 | A1 | 2/2021 |
| WO | WO 2021/225696 | A1 | 11/2021 |
| WO | WO 2021/226616 | A1 | 11/2021 |
| WO | WO2021232228 | A1 | 11/2021 |

OTHER PUBLICATIONS

LG Electronics, "Discussion on essential corrections in physical layer structure," R1-2000772, 3GPP TSG RAN\WG1 RL1, the TSGR1, 103-E stage, dated Nov. 2, 2020, 25 pages.
First Office Action issued on Jul. 29, 2025 for Chinese Patent Application No. 202411928053.X.
Extended European Search Report issued in European Application No. 22936956.6 dated May 8, 2025 (8 pages).
International Search Report in International Application No. PCT/CN2022/087151 dated Nov. 25, 2022—3 pages.
Xiaomi. "Proposed new solution on service initiated by UE" 3GPP TSG-SA WG2#150E e-meeting S2-2202910, Apr. 12, 2022 (Apr. 12, 2022).

* cited by examiner

Figure 3

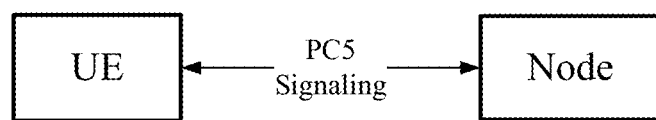

```
┌────────┐      PC5       ┌────────┐
│   UE   │◄── Signaling ──►│  Node  │
└────────┘                └────────┘
```

Figure 4

```
                    ┌────────┐
                    │  Node  │
                    └────────┘
        ┌──────────┬────┼────┬──────────┐
        ▼          ▼    ▼    ▼          ▼
  ┌─────────┐ ┌────────┐ ┌─────┐ ┌─────┐ ┌────────┐
  │ Another │ │V2X App.│ │ AMF │ │ LMF │ │  TRP   │  │Network│
  │   UE    │ │ Server │ └─────┘ └─────┘ └────────┘
  └─────────┘ └────────┘
```

Another UE, V2X App. Server, AMF, LMF, TRP, Network

Figure 5

```
              ┌─────────┐
              │ Network │
              └─────────┘
     ┌──────────┬───┴───┬──────────┐
     ▼          ▼       ▼          ▼
┌──────────┐ ┌────────┐ ┌─────┐ ┌────────┐
│Basestation│ │NG-RAN  │ │ gNB │ │Ng-eNB  │
│          │ │ node   │ └─────┘ └────────┘
└──────────┘ └────────┘
```

Basestation, NG-RAN node, gNB, Ng-eNB

Figure 6
```
                    ┌─────────────────┐
                    │  PC5 Signaling  │
                    └─────────────────┘
          ┌───────────┬──────┴──────┬────────────┐
          ▼           ▼             ▼            ▼
   ┌──────────┐ ┌───────────┐ ┌──────────┐ ┌─────────────┐
   │ Location │ │ Assistance│ │Capability│ │ Measurement │
   │          │ │   Data    │ │          │ │   Report    │
   └──────────┘ └───────────┘ └──────────┘ └─────────────┘
```
Figure 7
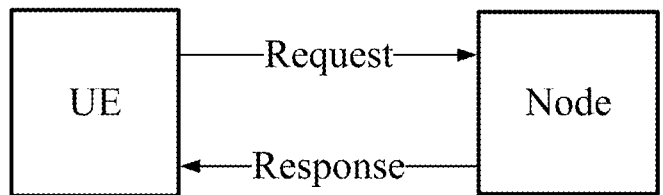
Figure 8
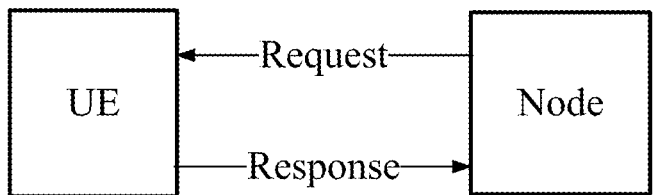

Figure 9

| V2X Application |
| :---: |

| NAS/PC5 |
| :---: |

| RRC |
| :---: |

| PDCP |
| :---: |

| RLC |
| :---: |

| MAC |
| :---: |

| PHY |
| :---: |

WIRELESS COMMUNICATION OF POSITIONING THROUGH SIDELINK

CROSS-REFERENCE TO RELATED APPLICATION

This application claims priority as a Continuation to PCT App. No. PCT/CN2022/087151, filed on Apr. 15, 2022, published as WO 2023197311 A1, entitled "WIRELESS COMMUNICATION OF POSITIONING THROUGH SIDELINK", the entire disclosure of which is hereby incorporated by reference.

TECHNICAL FIELD

This document is directed generally to wireless communications. More specifically, positioning information is communicated through sidelink.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. With the development of wireless multimedia services, demands of high data rate services are increasing as well as the requirements for system capacity and coverage of conventional cellular network. In addition, increased usage for public safety, social network, short distance data sharing, local advertisement, and other demands of proximity services which allow people to communicate with adjacent people or objects are also increasing. Device-to-device (D2D) communication technology may serve such demands. In order to improve communications and meet reliability requirements for the vertical industry as well as support the new generation network service, communication improvements for D2D should be made.

SUMMARY

This document relates to methods, systems, and devices for sidelink communications for positioning between devices. The sidelink based communications may be between equipment ("UE") and/or with other network nodes, such as a basestation and may include sidelink positioning information for location determination. This may include D2D scenarios as well as vehicle to everything (V2X) communications via a PC5 interface. The sidelink positioning information is communicated via the PC5 interface and includes location, capability, assistance data, and measurement reports.

In one embodiment, a method for wireless communication includes receiving, by a user equipment (UE), sidelink positioning information via a first signaling, according to an association between the sidelink positioning information and the first signaling, wherein the first signaling comprises at least one of PC5 signaling, PC5-RRC signaling, media access control (MAC) control element (MAC-CE), sidelink control information (SCI), radio resource control (RRC)

signaling, LTE Positioning Protocol (LPP) signaling, or signaling generated at a new logical layer, further wherein the sidelink positioning information comprises at least one of a sidelink location request, a sidelink location response, a sidelink positioning capability request, a sidelink positioning capability response, a sidelink assistance data request, a sidelink assistance data response, a sidelink measurement request, or a sidelink measurement response. The sidelink positioning information is sent from another node, wherein the another node comprises at least one of a network node or another UE. The network node comprises at least one of an NG-RAN node, a location management function (LMF), an access and mobility management function (AMF), a gNB, a ng-eNB, a transmission reception point (TRP), a positioning reference signal (PRS)-only-transmission point (TP). The sidelink positioning information is sent from the network node, the method further includes receiving, from the network node, the assistance information which comprises at least one of sidelink assistance data of the UE, sidelink assistance data of associated peer UEs, or sidelink positioning capability of the associated peer UEs. The method includes receiving the sidelink positioning information via a broadcast from PC5-RRC signaling.

In some embodiments, the association between the sidelink positioning information and the first signaling comprises one or more of the sidelink location request, the sidelink location response, the sidelink positioning capability request, the sidelink positioning capability response, the sidelink assistance data request, the sidelink assistance data response, the sidelink measurement request, or the sidelink measurement report are conveyed by PC5-RRC signaling. In some embodiments, the association between the sidelink positioning information and the first signaling comprises one or more of the sidelink location request, the sidelink location response, the sidelink positioning capability request, the sidelink positioning capability response, the sidelink assistance data request, the sidelink assistance data response, the sidelink measurement request, or the sidelink measurement report are conveyed by PC5 signaling. In some embodiments, the association between the sidelink positioning information and the first signaling comprises one or more of the sidelink location request, the sidelink location response, the sidelink positioning capability request, the sidelink positioning capability response, the sidelink assistance data request, the sidelink assistance data response, the sidelink measurement request, or the sidelink measurement report are conveyed by signaling generated at a new logical layer. In some embodiments, the association between the sidelink positioning information and the first signaling comprises one or more of the sidelink location request, the sidelink location response, the sidelink measurement request, and the sidelink measurement report are conveyed by PC5 signaling, while one or more of the sidelink positioning capability request, the sidelink positioning capability response, the sidelink assistance data request, and the sidelink assistance data response are conveyed by PC5-RRC signaling. In some embodiments, the association between the sidelink positioning information and the first signaling comprises one or more of the sidelink location request, and the sidelink location response are conveyed by PC5 signaling, while one or more of the sidelink positioning capability request, the sidelink positioning capability response, the sidelink assistance data request, the sidelink assistance data response, the sidelink measurement request, and the sidelink measurement report are conveyed by PC5-RRC signaling. In some embodiments, the association between the sidelink positioning information and the first signaling comprises one or more of the sidelink location request, the sidelink location response, the sidelink positioning capability request, the sidelink positioning capability response, the sidelink assistance data request, the sidelink assistance data response, or the sidelink measurement report are conveyed by PC5-RRC signaling, while the sidelink measurement request is conveyed by sidelink control information (SCI) or MAC-CE. In some embodiments, the association between the sidelink positioning information and the first signaling comprises one or more of the sidelink location request, the sidelink location response, the sidelink positioning capability request, the sidelink positioning capability response, the sidelink assistance data request, the sidelink assistance data response, or the sidelink measurement report are conveyed by PC5 signaling, while the sidelink measurement request is conveyed by sidelink control information (SCI) or MAC-CE. In some embodiments, the association between sidelink positioning information and the first signaling comprises one or more of the sidelink location request, the sidelink location response, the sidelink positioning capability request, the sidelink positioning capability response, the sidelink assistance data request, the sidelink assistance data response, or the sidelink measurement report are conveyed by signaling generated at a new logical layer, while the sidelink measurement request is conveyed by sidelink control information (SCI) or MAC-CE.

In some embodiments, the sidelink location request comprises at least one of a request to receive a sidelink positioning reference signal (SL-PRS), a request to transmit a SL-PRS, a quality of service (QOS) requirement, a request to receive sidelink assistance data, a request to transmit sidelink assistance data, or a sidelink positioning method. The sidelink location response comprises at least one of an indication of location response success, or an indication of location response failure. The sidelink capability request and the sidelink capability response comprise at least one of a transmitting capability, a receiving capability, a processing capability, a reporting capability, or a positioning calculation capability. The sidelink assistance data request comprises at least one of an assistance data for calculating positioning estimates, or a sidelink positioning reference signal (SL-PRS) configuration. The sidelink assistance data response comprises at least one of an assistance data for calculating sidelink positioning estimates, a quality of service (Qos) requirement, a sidelink positioning reference signal (SL-PRS) configuration, or an identifier for identifying an SL-PRS configuration. The sidelink measurement request comprises at least one of a sidelink positioning reference signal (SL-PRS) resource identifier to indicate sending of the SL-PRS resource, a SL-PRS resource identifier to indicate receiving of the SL-PRS resource, a deleted SL-PRS resource identifier, a sidelink positioning reference signal (SL-PRS) resource set identifier to indicate sending of the SL-PRS resource set, a SL-PRS resource set identifier to indicate receiving of the SL-PRS resource set, a deleted SL-PRS resource set identifier, modified SL-PRS features, a quality of service (QOS) requirement, a sidelink positioning method, or a synchronization source. The sidelink measurement response comprises at least one of a sidelink positioning reference signal (SL-PRS) reference signal received power (RSRP), a SL-PRS time of arrival (TOA), a SL-PRS Rx-Tx time difference, a SL-PRS reference signal time difference (RSTD), a SL-PRS Rx beam index, a time stamp for a measurement, a time quality, a measurement quality, an identifier of which SL-PRS the measurements are taken, an identifier of which UE the measurements are taken, or a synchronization source.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 3 shows an example sidelink communication with PC5 signaling.

FIG. 4 shows example nodes in sidelink communication with a user equipment (UE).

FIG. 5 shows example network devices for the nodes in sidelink communication with a user equipment (UE).

FIG. 6 shows example PC5 signaling.

FIG. 7 shows an example sidelink communication.

FIG. 8 shows another example sidelink communication.

FIG. 9 shows an example layer structure.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
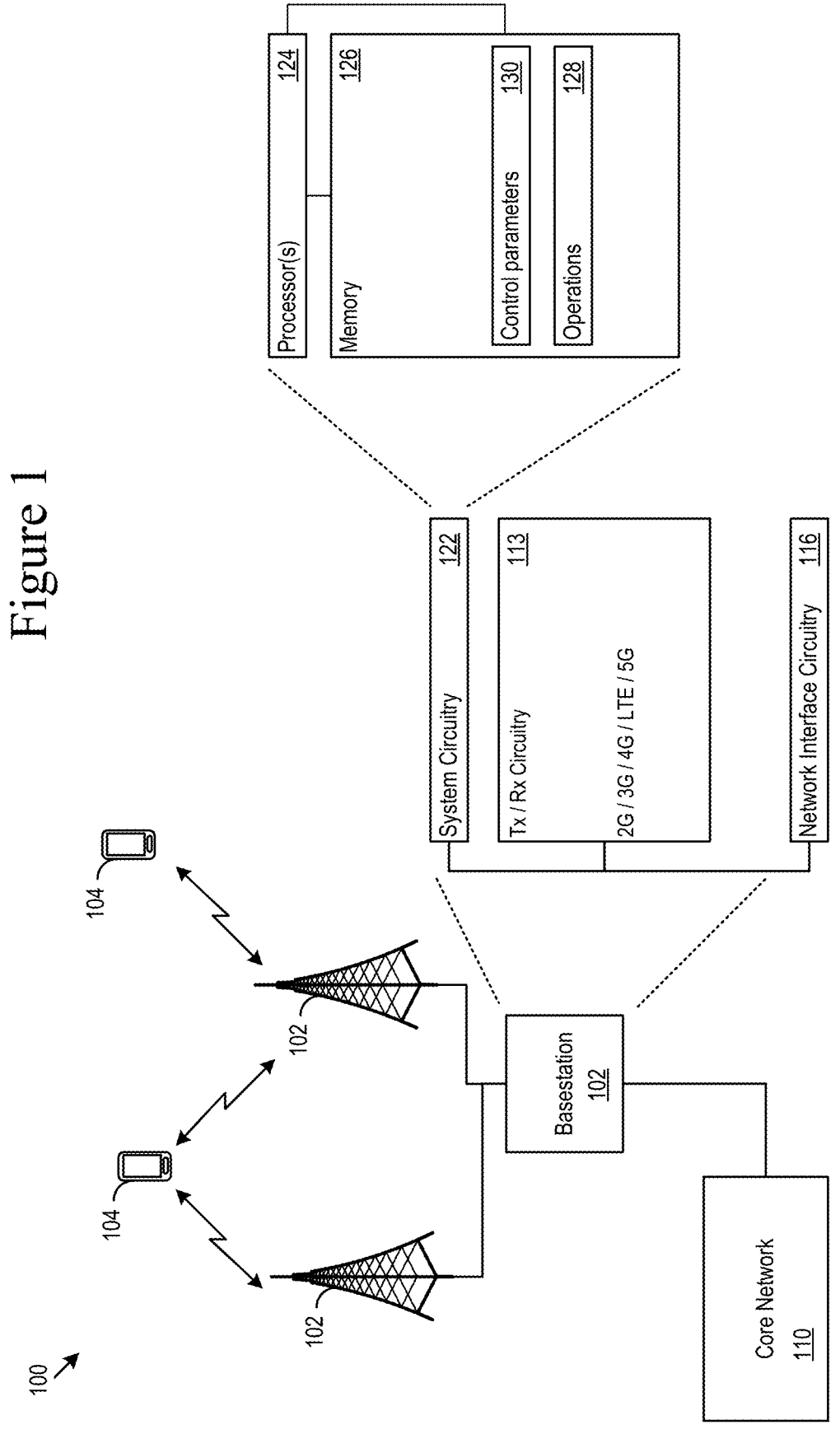
FIG. 1 shows an example basestation.
Figure 2:
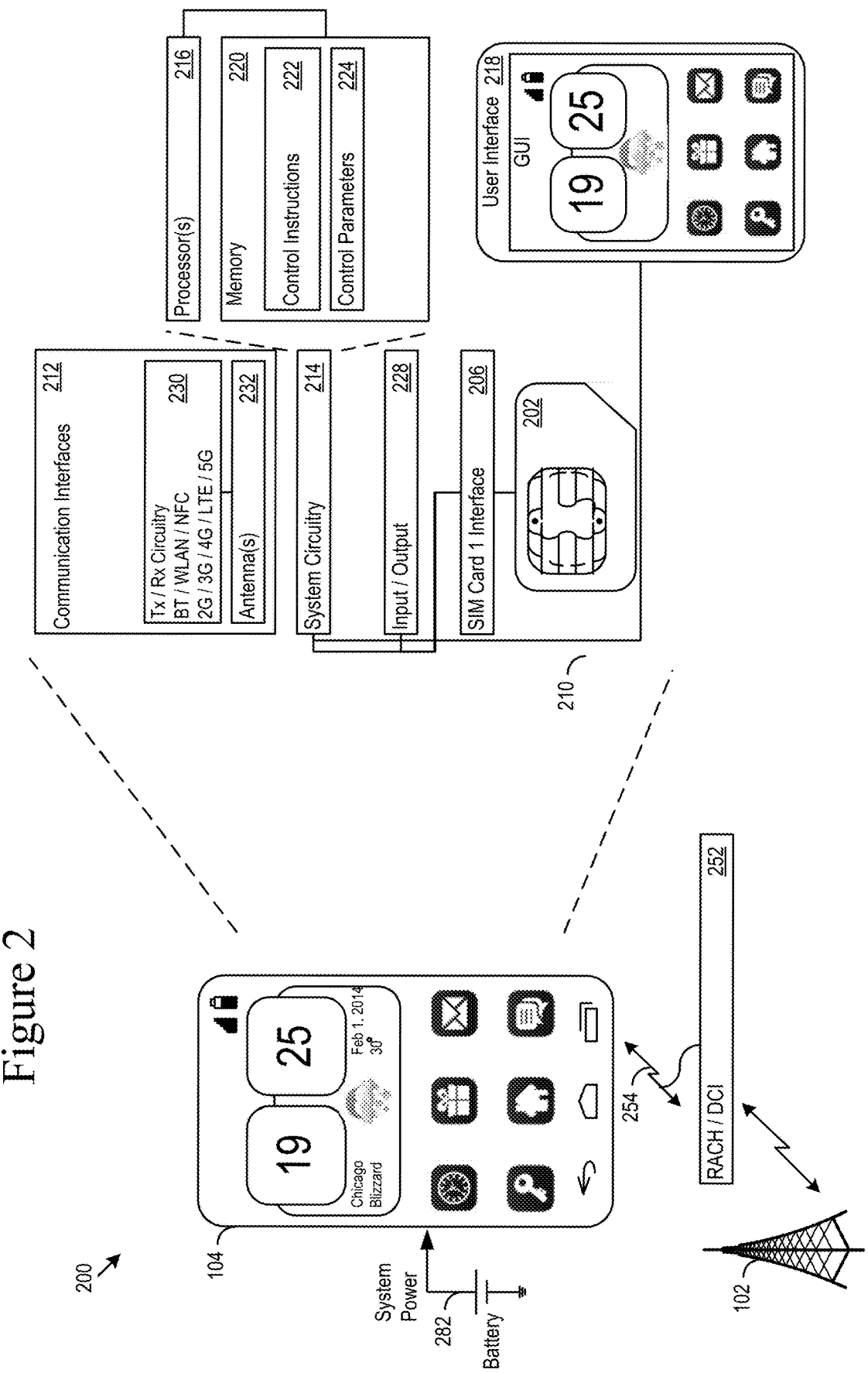
FIG. 2 shows an example random access (RA) messaging environment.

The wireless communications described herein may be through radio access including new radio ("NR") access. Radio resource control ("RRC") is a protocol layer between user equipment ("UE") and the network (e.g. basestation or gNB) at the IP level (Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). The UE can transmit data through a Random Access Channel ("RACH") protocol scheme or a Configured Grant ("CG") scheme or grant scheme. The RACH scheme is merely one example of a protocol scheme for communications and other examples, including but not limited to CG, are possible. FIGS. 1-2 show example radio access network ("RAN") nodes (e.g. basestations) and user equipment and messaging environments. The communications described herein may be specific to sidelink communications, which may also be referred to as device to device ("D2D") communications.

There may be at least two technical schemes including an internet protocol ("IP") layer (Layer 3 or "L3") and an access layer (Layer 2 or "L2") for the sidelink communications. The layer 3 based relay forwards data according to IP information (e.g. IP address or IP port number) of the UE. The layer 2 based relay routes and forwards data of user plane and control plane in access layer, allowing network operator (i.e. core network and/or the BS) to manage the remote UE more effectively.

Sidelink communications may relieve the burden of the cellular network, power consumption of user equipment ("UE") can be reduced, data rates can be increased, and robustness of network infrastructures can be improved, all of which can fulfill the demands of high data rate services and the proximity services. The relay communications or D2D technology may also be referred to as a proximity service ("ProSe") or sidelink communications. An interface between equipment may be known as or referred to as a PC5 interface. PC5 may be where the UE directly communicates with another UE over a direct channel without the basestation. In some embodiments, the sidelink-based relay communication may be applied to indoor relay communication, smart farming, smart factory and public safety services. Sidelink may work depending on the positioning of each of the devices. For example, two user equipment (UE) devices must be in range to engage in sidelink communications. The positioning may also be referred to as ranging, and may include relative positioning and absolute positioning. Based on the positioning, the bandwidth requirements may be different to meet accuracy requirements.

The UE can perform positioning with the network via a UU interface by sending a sounding reference signal (SRS) and receiving a positioning reference signal (PRS) signal. When the UE is out of the coverage area of the network (NW), or when the UE is in a coverage area of the NW but has a low channel quality, then the UE may need to acquire its precise location. In one example, the UEs may be cellular vehicle to everything (CV2X or C-V2X) or vehicle to everything (V2X) UEs. The sidelink technology can be applied to V2X UEs to perform positioning. Sidelink technology can specify the communication between V2X UEs for the transmission of control signaling and service data via a PC5 interface. The PC5 interface may include PC5 signaling, or PC5 RRC signaling to specify a configuration for a unicast link or resource allocation. Signaling transfer methods or procedures can specify a high layer structure for sidelink positioning. Sidelink may refer to the direct communication over PC5.

Vehicle to vehicle (V2V) communications may be based on D2D communications. The D2D interface may be designated as PC5 and is also known as sidelink at the physical layer. The PC5 interface has been enhanced for vehicular use cases, including addressing high speed and high density (number of nodes). The direct communication between a vehicle and other devices (V2V, V2I) may use the PC5 interface. PC5 may refer to a reference point the UE communicates with a node over a direct channel without the basestation. When sidelink positioning information (e.g. location, capability, assistance data, measurement, etc. described herein) is conveyed by a first signaling (e.g. PC5 signaling or other signaling described herein), it may be referred to as an association between the first signaling and sidelink positioning information.

A transfer between UEs may be from an initiating UE and a transfer UE. The initiating UE may be the UE wants to acquire its own location by sidelink positioning, or may be the UE receiving the location request from the network. The target UE(s) may be the UE(s) that are initiating UE transmissions of Sidelink Positioning Reference Signal (SL-PRS) to/receives SL-PRS. The initiating UE and the target UE may form a UE pair. In order to perform SL positioning, the target UE should know its precise location. The initiating UE may be referred to as a target UE and when the target UE corresponds to the initiating UE it may be referred to as a peer UE or associated peer UE. The target UE may be the UE that wants to acquire its own location by sidelink positioning or the UE receiving the location request from the network. The peer UE(s) are the UE(s) that initiate the UE transmission of SL-PRS or receives the SL-PRS. The target UE and associated peer UE may form a UE pair. Peer UE may also be referred to as anchor UE and to perform SL positioning, peer UE may need to know its precise location. In the example embodiments, the initiating UE is shown up with the target UE, and the target UE is shown up with peer UE. The embodiments may be applicable when the UE is in any coverage, including 1) when both UEs in the UE pair are in coverage/partial coverage of network; 2) when one of the UE in the UE pair is in coverage/partial coverage, while the other one is out of coverage; or 3) both UEs in the UE pair are out of coverage.

Sidelink communications may be used for positioning between devices. The sidelink based communications may be between equipment ("UE") and/or with other network nodes, such as a basestation. The sidelink positioning information may be used for location determination. This may include vehicle to everything (V2X) communications via a PC5 interface. The sidelink positioning information is communicated via the PC5 interface and includes location, capability, assistance data, and measurement reports. The FIGS. 3-24 below show exemplary embodiments for sidelink communications. FIGS. 1-2 show example basestations and user equipment and messaging environments which may be applicable to the sidelink communications as described below. The description of UEs and the network above may apply to each of the embodiments.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Sidelink communication may also be referred to as sidelink messaging, sidelink relay, relay communications, or device to device ("D2D") communication/messaging. There may be communication between devices, such as multiple user equipment (UE) devices. The sidelink communications may further include a send, a receive, a broadcast, a unicast, a request, a response, a forward, an exchange or a groupcast.

The sidelink information or the positioning information may include a sidelink positioning reference signal (SL-PRS) configuration. The SL-PRS configuration may be indicated in control signaling, in a control channel, in other channel(s), or in a Radio Resource Control (RRC) parameter. The control signaling may include sidelink control information (SCI), downlink control information (DCI), Medium Access Control (MAC) Control Elements (MAC CE), Non Access Stratum (NAS), or system information blocks (SIB). The control channel includes at least one of a physical sidelink control channel (PSCCH), a physical downlink control channel (PDCCH), or a physical uplink control channel (PUCCH). The other channel(s) include at least one of a physical sidelink shared channel (PSSCH), a physical downlink shared channel (PDSCH), a physical uplink shared channel (PUSCH), a Physical Broadcast Channel (PBCH), a Physical Sidelink Feedback Channel (PSFCH), or a Physical Sidelink Broadcast Channel (PSBCH).

In some embodiments, such as during emergency situations (e.g. earthquake), the cellular network may operate abnormally or a sidelink communication range of the network may need to be extended. Thus, the relay communications may be designed for allowing multiple UEs to communicate with each other via the relay UE. Although not shown, there may be multiple UEs in a relay communication chain, or a relay UE may have multiple remote UEs. The interface in FIG. 5a between the UE and BS during relay communications is referred to as the Uu interface.

FIG. 3 shows an example sidelink communication with PC5 signaling. The sidelink communication is further described with respect to FIGS. 7-8 below. In some embodiments, the sidelink communications may be between user equipment (UE), a network node, a basestation, a local sever, a Transmission/Reception Point (TRP), or a Location Management Function (LMF). The UE 104 described above with respect to FIGS. 1-2 may be a vehicle UE, pedestrian UE, or a road side unit (RSU) with or without known location. The UE may include a positioning reference unit (PRU) with or without a known location. The UE may be any UE that supports vehicle to everything (V2X) service and/or sidelink communication. Although illustrated as PC5 signaling, the sidelink communications between the UE and the node may include other types of signaling, such as PC5-RRC signaling, sidelink control information (SCI), new logical layer signaling, or media access control control element (MAC-CE). FIG. 3 illustrates communications between a UE and a node. The node may be any of the nodes illustrated in FIG. 4.

FIG. 4 shows example nodes in sidelink communication with a user equipment (UE). The node may be in sidelink communication with the UE 104. The node may include another UE, such as a different UE 104. Alternatively, the node may be a network node. The network node is part of the network and is further described with respect to FIG. 5.

Other example nodes include a V2X application server or a transmission/reception point (TRP). In one embodiment, location management function (LMF) may be used to improve positioning. LMF may receive measurements/assistance information from the basestation and the UE. This may be transmitted via the access and mobility management function (AMF) to calculate the UE position. The LMF may configure the UE via AMF, while the basestation may configure the UE using radio resource control (RRC) protocol.

FIG. 5 shows example network devices for the nodes in sidelink communication with a user equipment (UE). The sidelink communications between UEs may also include the network node. The network node may include a basestation, which may be an example of a next-generation radio access node (NG-RAN). The network node may further include a gNode B (gnB) or a next generation eNodeB (ng-enB). Although described separately in FIG. 4, the network may further include a core network, a Transmission/Reception Point (TRP), or a Location Management Function (LMF).

FIG. 6 shows example PC5 signaling. Although described as PC5 signaling, the signaling may include other signaling types, including other types of sidelink and/or D2D communications, including V2X communications. The signaling may include location information, assistance data, capability information and/or measurement reports. There may be a request and response for each of the signaling as further described with respect to FIGS. 7-8. The signaling types/information shown in FIG. 6 may apply to the other embodiments as example information transmitted.

Location Information

The location information may include a location or information about a location/position. The UE can request a location (e.g. FIG. 8), or another node can request the location from the UE (e.g. FIG. 7). The location request may include a sidelink positioning specific V2X service identifier received from upper layer. The location request may include a a request to perform sidelink positioning. The location request may include a request to receive a sidelink positioning reference signal (SL PRS) from other UE(s), or a request to transmit a SL PRS to other UE(s). The location request may include a request to receive assistance data configuration from other UE(s), or a request to transmit assistance data configuration to other UE(s). The location request may include a required key performance indicators (KPIs) and positioning requirements, which may include positioning accuracy, response time, horizontal accuracy, vertical accuracy, timing quality, etc. The location request may include nothing but an information element (IE) indicating the UE requests other UEs to perform SL positioning. The location request may include a sidelink (SL) positioning method, such as: whether to measure single trip PRS and provide single trip measurements, or measure multiple trip PRS and provide round trip measurements, or measure SL PRS and downlink (DL) PRS and provide general measurements, or measure SL PRS and UL SRS and provide general measurements, or measure RSTD, or measure angle of arrival (AoA), or measure angle of departure (AoD).

The UE location response may include a successful location response that indicates the UE can perform SL positioning. Alternatively, the location response may include a location response failure that indicates the UE cannot perform SL positioning.

Capability Information

The capability may include a capability to send sidelink information to a certain communication device, a capability to receive sidelink information from a certain communication device, a capability to exchange the signaling or interact signaling with a certain communication device, a capability to forward sidelink information about a certain communication device, a capability of receiving sidelink information from a certain communication device, or a capability of coverage of the network. In other examples, the UE capability includes a capability of supporting positioning function, a capability of communicating a positioning reference signal (PRS), a capability of supporting positioning method measurement, a capability to support aperiodic or semi-persistent PRS, a capability of communicating the control information, a capability of supporting multi-RTT method, or a capability of supporting multi-RTT measurement capability.

The sidelink related capability request may include nothing but an information element (IE) indicating UE requests the sidelink capability. In another embodiment, the sidelink related capability request may include an indicator on which kind of SL positioning capability is required. For example, SL PRS transmitting capability, SL PRS receiving capability, SL PRS processing capability, SL PRS reporting capability, SL positioning calculation capability, or other capabilities may be required.

The sidelink related capability provision may include an SL PRS transmitting capability that indicates whether the UE can transmit periodic/semi-persistent/aperiodic SL PRS, and/or whether the UE can transmit both SL PRS and UL SRS. In another embodiment, the sidelink related capability provision may include SL PRS receiving capability that indicates whether the UE can receive periodic/semi-persistent/aperiodic SL PRS, and/or UE can receive both SL PRS and DL PRS, or UE can receive SL PRS as well as transmit UL SRS. In another embodiment, the sidelink related capability provision may include SL PRS processing capability that indicates whether the UE can measure SL PRS and provide measurements, such as at least one of SL-PRS-RSRP, SL-RSRPP, SL-PRS-TOA, SL-PRS-RTOA, SL-PRS-Rx-Tx time difference, SL-PRS-RSTD, SL-PRS Rx beam index, and/or UE can measure both SL PRS and DL PRS and provide both measurements, and/or UE can measure both SL PRS and UL SRS and provide corresponding measurements. In another embodiment, the sidelink related capability provision may include SL positioning calculation capability that indicates whether the UE is capable of calculating location estimates based on SL positioning, and/or whether the UE is capable of calculating location estimates based on SL positioning and traditional RAT-dependent/RAT-independent positioning methods via a uu interface. In another embodiment, the sidelink related capability provision may include SL PRS reporting capability, such as the maximum number of target UEs that initiating UE is able to receive PRSs from, or a maximum number of SL PRS measurements that a UE can support to measure.

Assistance Data

The SL assistance data configuration of a UE to transmit can be provided by the network, or by pre-configuration, or by UE self-configuration/self-generated. The pre-configuration of SL assistance data can be seen as a default configuration of a UE. The SL assistance data configuration may include Tx SL PRS configuration of this UE. Tx SL PRS configuration may include the SL PRS's configuration that a UE is available or going to transmit PRS according to the assistance data configuration, including Tx SL PRS configuration of one UE may be the same or different with other UEs. UEs perform SL positioning should know whether their Tx SL PRS configurations are the same or different. If different, SL PRS configuration delivery between UEs may be needed to inform other UEs the SL PRS configuration of oneself. Other UEs can then receive SL PRS correctly. The SL assistance data information (including SL PRS configuration) is self-configuration or pre-configuration by UE in application layer/NAS layer/RRC layer. For self-configuration, how the SL PRS configuration is determined is a UE's implementation.

An assistance data request of a UE may include nothing but an IE indicating UE requests the sidelink assistance data. In another embodiment, the assistance data request may include assistance data used for calculating SL positioning estimates, such as target UE's location (PRU or RSU), the synchronization source/reference of the target UE (PRU or RSU), the beam information of configured SL PRSs, or other examples. In another embodiment, the assistance data request of a UE may include a SL PRS configuration, such as SL PRS resource set/SL PRS resource configuration, the period of SL PRS resource/SL PRS resource set, number of symbols that a SL PRS occupied in a slot, start symbol of SL PRS in a slot, SL PRS resource frequency location and bandwidth, SCS, comb size, muting pattern, PRS QCL information, periodic/semi-persistent/aperiodic SL PRS, etc. In another embodiment, the assistance data request of a UE may include a requested SL PRS configuration, such as the selected PRS resource set ID/PRS resource ID (e.g. from pre-configuration), selected some of the PRS features, etc.

The assistance data response of a UE may include an SL positioning method, such as: whether to measure single trip PRS and provide single trip measurements, or measure multiple trip PRS and provide round trip measurements, or measure SL PRS and DL PRS and provide general measurements, or measure SL PRS and UL SRS and provide general measurements, or measure RSTD, or measure AoA, or measure AoD. In another embodiment, the assistance data response may include assistance data used for calculating SL positioning estimates, such as target UE's location (PRU or RSU), the synchronization source/reference of the target UE (PRU or RSU), the beam information of configured SL PRSs, etc. In another embodiment, the assistance data response may include a QoS requirement, such as response time, positioning accuracy, response time, horizontal Accuracy, vertical Accuracy, timing quality, etc. In another embodiment, the assistance data response may include an SL PRS configuration, such as SL PRS resource set/SL PRS resource configuration, the period of SL PRS resource/SL PRS resource set, number of symbols that a SL PRS occupied in a slot, start symbol of SL PRS in a slot, SL PRS resource frequency location and bandwidth, SCS, comb size, muting pattern, PRS QCL information, whether it is periodic/semi-persistent/aperiodic SL PRS, etc. In another embodiment, the assistance data response may include an identifier of which UE the SL PRS configuration belongs to, such as a UE's ID (UEID), PC5 unicast link identifier, V2X service identifier, UE's application layer ID, destination layer-2 ID, source layer-2 ID, Source user info, target user info, etc.

Measurement Request/Report

The sidelink measurement request may include nothing but an IE indicating. In another embodiment, the sidelink measurement request may include an indication that UE requests other UEs perform SL positioning based on the assistance data provided.

The measurement request may include:

a selected SL PRS resource ID/SL PRS resource set ID in an assistance data configuration or a SL PRS configuration to indicate the initiating UE may send the selected PRSs. If the SCI or MAC CE containing this is sent, initiating UE should start to send corresponding SL PRSs; if the SCI or MAC CE including this is received by other target UEs, other target UEs should start to receive corresponding SL PRSs;

a selected SL PRS resource ID/SL PRS resource set ID in a assistance data configuration or a SL PRS configuration to indicate the PRSs that the initiating UE wishes to receive from other target UEs. If the SCI or MAC CE containing this is sent, initiating UE should start to receive corresponding SL PRSs; if the SCI or MAC CE containing this is received by other target UEs, other target UEs should start to send the corresponding SL PRSs;

a deleted SL PRS resource ID/SL PRS resource set ID;

a trigger request to initiating SL PRS transmission according to one assistance data configuration or one SL PRS configuration that upper layer provides;

a changed PRS features, including SL-PRS resource ID/SL-PRS resource set ID/assistance data configuration ID/SL PRS configuration ID together with at least one of the following can be carried in MAC-CE or SCI: SL-PRS priority, SL-PRS periodicity, SL-PRS resource offset, SL-PRS resource repetition factor, SL-PRS resource time gap, SL-PRS muting pattern, SL-PRS resource power, SL-PRS sequence ID, SL-PRS comb size, SL-PRS SCS, SL-PRS RB set, response time. The above IEs may be the changed IE as compared with the pre-configuration or network indication;

some selected SL PRS configuration that a UE requires other UE to measure;

a QoS requirement, such as response time, positioning accuracy, response time, horizontal Accuracy, vertical Accuracy, timing quality, etc.;

SL positioning method, such as: whether to measure single trip PRS and provide single trip measurements, or measure multiple trip PRS and provide round trip measurements, or measure SL PRS and DL PRS and provide general measurements, or measure SL PRS and UL SRS and provide general measurements, or measure RSTD, or measure AoA, or measure AoD; or synchronization source/reference of the target UE.

The sidelink measurement report in response to the measurement request may include:

at least one of SL-PRS-RSRP, SL-PRS-RSRPP, SL-PRS-TOA, SL-PRS-RTOA, SL-PRS-Rx-Tx time difference, SL-PRS-RSTD, SL-PRS Rx beam index;

time stamps at which the measurements are performed;

time quality or measurement quality;

identifier of which the measurements are derived. Such as UE's ID, PC5 unicast link identifier, V2X service identifier, peer UE's application layer ID, destination layer-2 ID, source layer-2 ID, Source user info, target user info, etc.; or synchronization source/reference of the target UE.

Initiating UE sends SL PRS to other target UEs, and target UEs perform SL PRS measurement and provide SL positioning measurements to an initiating UE. The initiating UE can configure SL positioning measurements via PC5-RRC signaling, and target UEs can reply with the SL positioning measurements via PC5-RRC signaling. The SL positioning measurement can be configured and processed in UE's RRC layer. In some embodiments, configurations can include at least one of the following:

For NR sidelink measurement, a NR sidelink measurement object indicates the PRS resource(s)/PRS resource set(s) to be measured. The PRS resource ID(s)/PRS resource set ID(s) that need UE to measure can be contained in SL-MeasObject-r16 (which is embedded in SL-MeasObjectList-SL-MeasConfig-r16-RRCReconfigurationSidelink).

Add PRS as a new RS type in NR sidelink reporting configuration. Add SL-PRS in SL-RS-Type-r16 (which is embedded in SL-ReportConfig-r16-SL-ReportConfigInfo-r16-SL-ReportConfigList-SL-MeasConfig-r16-RRCReconfigurationSidelink).

Add at least one of SL-PRS-RSRP, SL-RSRPP, SL-PRS-TOA, SL-PRS-RTOA, SL-PRS-Rx-Tx time difference, SL-PRS-RSTD, SL-PRS Rx beam index in the reporting format in NR sidelink reporting configuration. If SL-PRS-Rx-Tx time difference is configured in the reporting format, that means initiating UE wants target UEs to measure round trip SL PRS.

Except for periodical or event triggered reporting, add a new reporting criterion dedicated for SL PRS measurement. The new reporting criterion may be configured in sl-ReportType-r16.

Add a new event for SL PRS measurement. For example, S3 is when UE receives location request and needs to perform SL positioning, S3 is triggered.

Add a new IE to indicate the PRSs need to be measured and the measurement requirement, for example, whether additional paths of the PRS is needed to measure, and the synchronization source/reference. The new IE can contain in SL-MeasConfig-r16, SL-MeasObject-r16 or SL-ReportConfigId-r16.

When a target UE receives the RRCReconfigurationSidelink with the above SL PRS measurement configuration, the target UE performs SL PRS measurement and reports to the UE initiating the RRCReconfigurationSidelink via MeasurementReportSidelink. Adding the SL PRS measurement results in SL-MeasResult-r16, and the SL PRS measurement results may include at least one of SL-PRS-RSRP, SL-RSRPP, SL-PRS-TOA, SL-PRS-RTOA, SL-PRS-Rx-Tx time difference, SL-PRS-RSTD, SL-PRS Rx beam index. In another example, when UE's RRC layer receives the measurement report, UE can pass it to upper layers to calculate positioning estimate.

FIG. 7 shows an example sidelink communication. In one example, a UE transmits/reports information to a node in response to a request from the node. The node receives the transmitted information from the UE. In this example, the information may be requested by the node. The request/response may include the information discussed with respect to FIG. 6.

FIG. 8 shows another example sidelink communication. In one example, a node transmits/reports information to a UE in response to a request from the UE. The UE receives the transmitted information from the node. In this example, the information may be requested by the UE. The request/response may include the information discussed with respect to FIG. 6.

FIG. 9 shows an example layer structure. The layers shown in FIG. 9 are merely examples and there may be more of fewer layers in various embodiments. The sidelink communications or PC5 signaling may be at different layers as discussed in the embodiments below.

The V2X application layer may be considered a logical layer to generate, carry, and/or convey information from the V2X application server. The V2X application layer may be the same or different as the V2X layer, and both V2X application layer and V2X layer may be the upper layer of RRC with respect to one UE.

The non-access stratum (NAS) layer may also be the application layer or part of the application layer. The NAS layer may be an upper layer of radio resource control (RRC) but a lower layer of the V2X application layer. In the example embodiments, the PC5-S (PC5 signaling) between UEs may be NAS layer signaling. The V2X application layer or NAS layer may indicate lower layers, such as PC5-RRC, media access control (MAC), or the physical layer (PHY) for some control parameters for transmitting or receiving the V2X transmission. The V2X application layer or NAS layer can also generate V2X service data and pass it to lower layer for transmission to another UE. The above V2X service data may carried in PSSCH and can be transmitted via broadcast, groupcast, or unicast. The transmission mode (broadcast, groupcast, or unicast) is also chosen and indicated by the V2X application layers or NAS layers. The indication of cast type may be carried in the second stage sidelink control information (SCI) in PSSCH. In some embodiments, there may be a Packet Data Convergence Protocol (PDCP) and radio link control (RLC) layer between the RRC layer and the MAC layer.

A V2X application server may exist in a UE, outside a UE (to take control of several UEs), or in the network. If the V2X application server is in network, it may transmit information to the UE via a uu interface. If the V2X application server is in the UE, then it may transmit information to other UEs via the PC5 interface.

Figure 10:
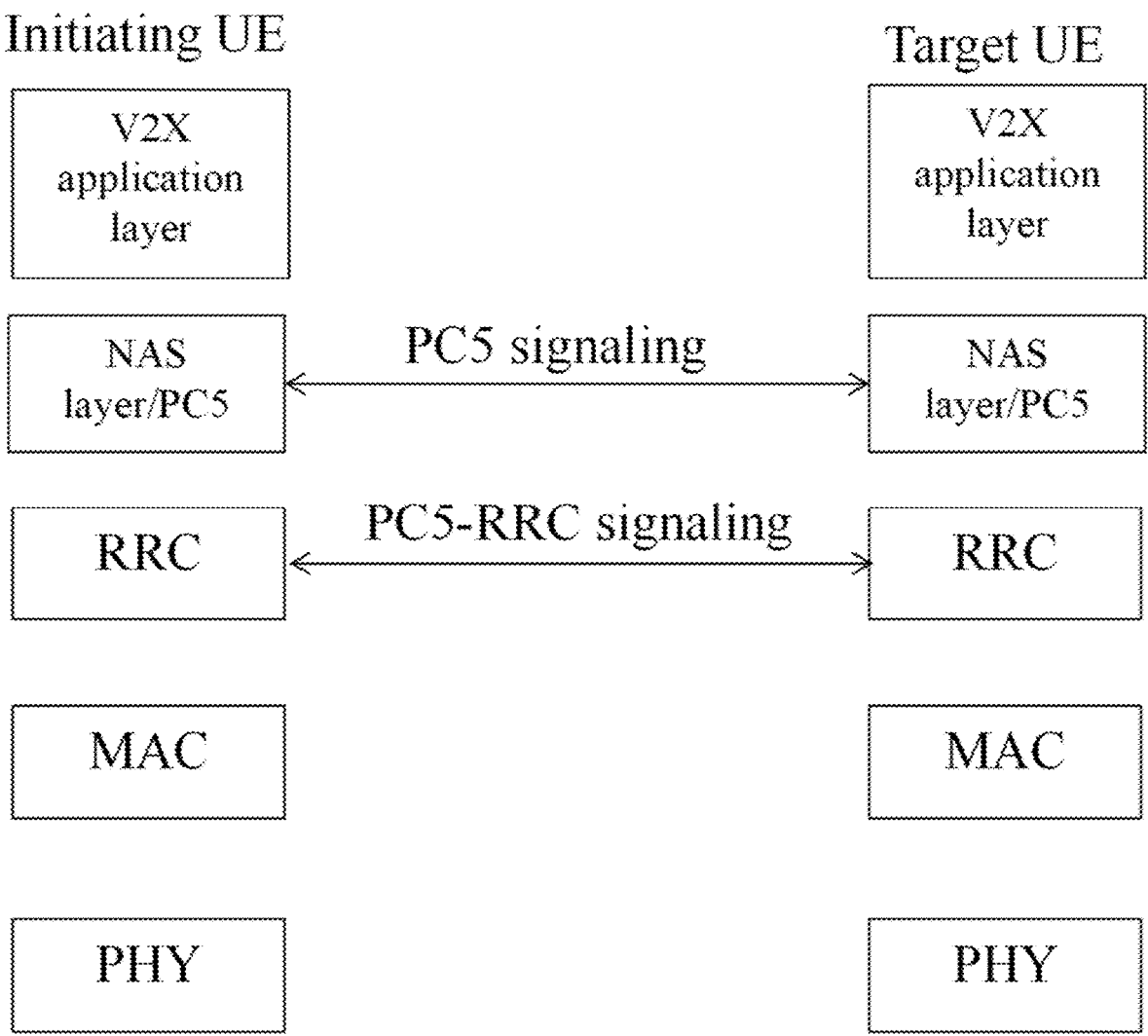
FIG. 10 shows an example signaling structure.

FIG. 10 shows an example signaling structure with a timing-based sidelink (SL) positioning method. There are two examples of sidelink communication signaling shown in FIG. 10. A PC5 signaling may be transmitted at the NAS layer. A PC5-RRC signaling may be transmitted at the RRC layer.

The timing-based positioning method in sidelink may include one initiating UE sending multiple PRS resources (e.g. SL PRS1, SL PRS 3, SL PRS 5), multiple target UEs receive the PRS resources. Multiple target UEs may also send its PRS resources (like SL PRS 2, SL PRS 4, SL PRS 6), then the initiating UE can receive PRS resources from multiple target UEs. The initiating UE can measure a reference signal time difference (RSTD) measurement between different target UE's PRS resources (e.g. RSTD 1 and RSTD 2), and the initiating UE can also measure multiple round trip time between its sending PRS and its receiving PRS, corresponding to each target UE (e.g. initiating UE's Rx Tx time difference. The initiating UE's Rx Tx time difference, initiating UE's Rx Tx time difference, and each target UE can measure its round trip time between the received initiating UE's PRS and its sending PRS (e.g. target UE 1's Rx Tx time difference, target UE 2's Rx Tx time difference, target UE 3's Rx Tx time difference).

The PC5 signaling can be transmitted between UEs after a unicast link has established, or, can be transmitted before a unicast link has established. If before the unicast link is established, the PC5 signaling can be transmitted via broadcast or groupcast. If after the unicast link is established, the PC5 signaling can be transmitted via broadcast, groupcast, or unicast.

In some embodiments, the V2X service data including SL positioning configuration may be broadcast/groupcast. In this example, the initiating UE is the UE that wants to acquire its own location by sidelink positioning, and target UE(s) are the UE(s) that initiating UE transmits SL-PRS to/receives SL-PRS from. The Initiating UE may be \pre-configured with the Tx SL PRS configuration as well as target UEs' known location, the known location may come from any sources, such as GNSS, or default factory settings, etc. Target UE(s) may be pre-configured with Tx SL PRS configuration. The two pre-configuration of Tx PRS may be the same or different. If different, it is assumed that initiating UE and target UE(s) know each others Tx PRS configuration according to pre-configuration or v2x application layer's indication. The initiating UE and target UE(s) may be provided a list of V2X service identifier to destination layer-2 ID for broadcast mapping rules, respectively. Each mapping rule includes one or more V2X service identifiers and the destination layer-2 ID for broadcast or groupcast.

The v2x application layer of the initiating UE and target UE(s) sets a new V2X service type for sidelink positioning. The V2X service type may also be represented as V2X service identifier. The initiating UE's location request can be embedded in V2X service data and broadcast or groupcast to target UE(s). When initiating UE broadcast or groupcast its location request, target UE(s) which are interested in this service type may send the SL-PRS according to the pre-configured PRS configuration. The initiating UE can also send the SL-PRS according to the pre-configured PRS configuration. Then, the initiating UE and target UE(s) both receives each others SL-PRS, they can perform SL-PRS measurement.

The above V2X service data may be transparent to lower layers (RRC, MAC, PHY). At the transmitting side, it may be generated at the V2X application layer and sent to lower layers for transmission. At the receiving side, the V2X service data may be sent from lower layer to upper layer (NAS layer or application layer) to process.

Figure 11:
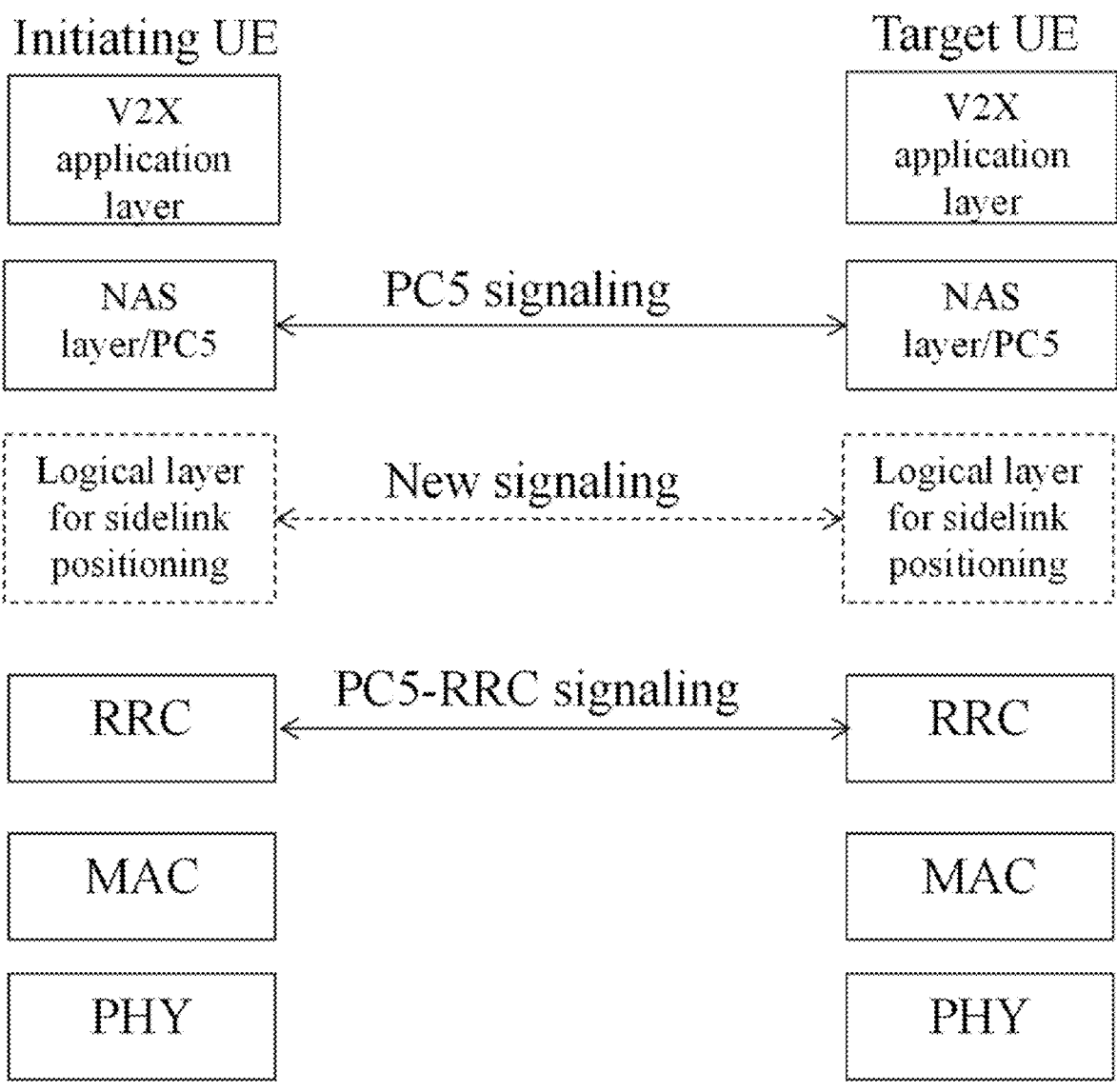
FIG. 11 shows an example signaling structure with a new logical layer for sidelink positioning.

FIG. 11 shows an example signaling structure with a new logical layer for sidelink positioning. The new logical layer may be between the NAS layer and the RRC layer in one embodiment. The new logical layer may be used to convey SL positioning related information. The new layer can be between PC5-S layer and PC5-RRC layer (NAS layer and AS layer) or the new layer can between V2X application layer and NAS layer (as in FIG. 12). In another embodiment, the new logical layer may be parallel to the NAS layer or the RRC layer or the application layer. The new logical layer may be included in the NAS layer or the application layer, the signaling transferred in the new layer may be PC5 signaling or PC5-RRC signaling or a new version of signaling, such as SL positioning protocol. The new signaling conveyed in the new logical layer may also be NAS message/NAS signaling.

Figure 12:
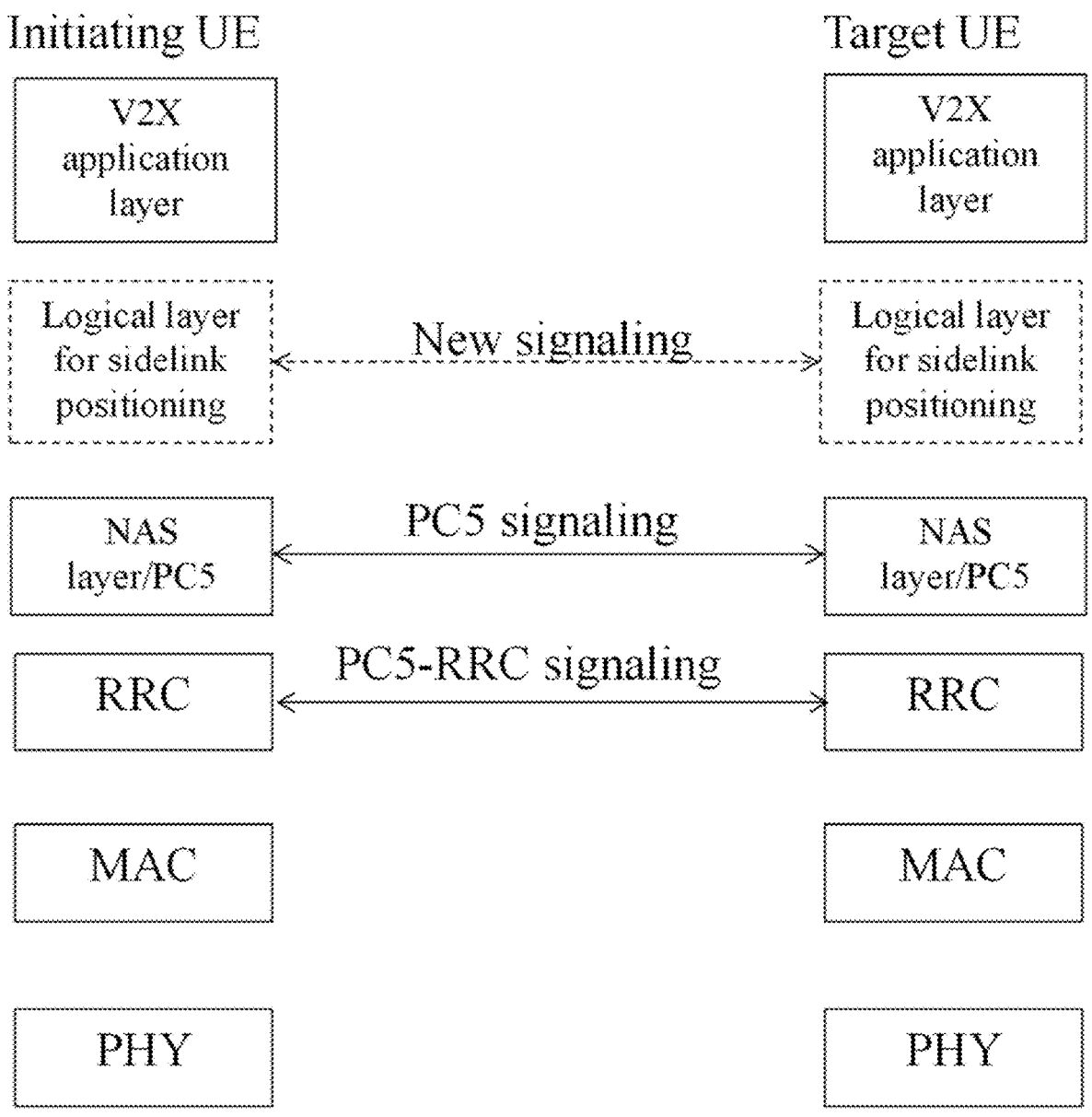
FIG. 12 shows another example signaling structure with a new logical layer.

FIG. 12 shows another example signaling structure with a new logical layer. The new logical layer in FIG. 11 is between the NAS layer and the RRC layer. FIG. 12 is an alternative embodiment, where the new logical layer is between the V2X application layer and the NAS layer. The new logical layer may be used to convey SL positioning related information. Alternatively, the new logical layer is included in the NAS layer or the application layer, the signaling transferred in the new layer may be PC5 signaling or PC5-RRC signaling or a new version of signaling, such as SL positioning protocol. The new signaling conveyed in the new logical layer may also be called NAS message/NAS signaling.

Figure 13:
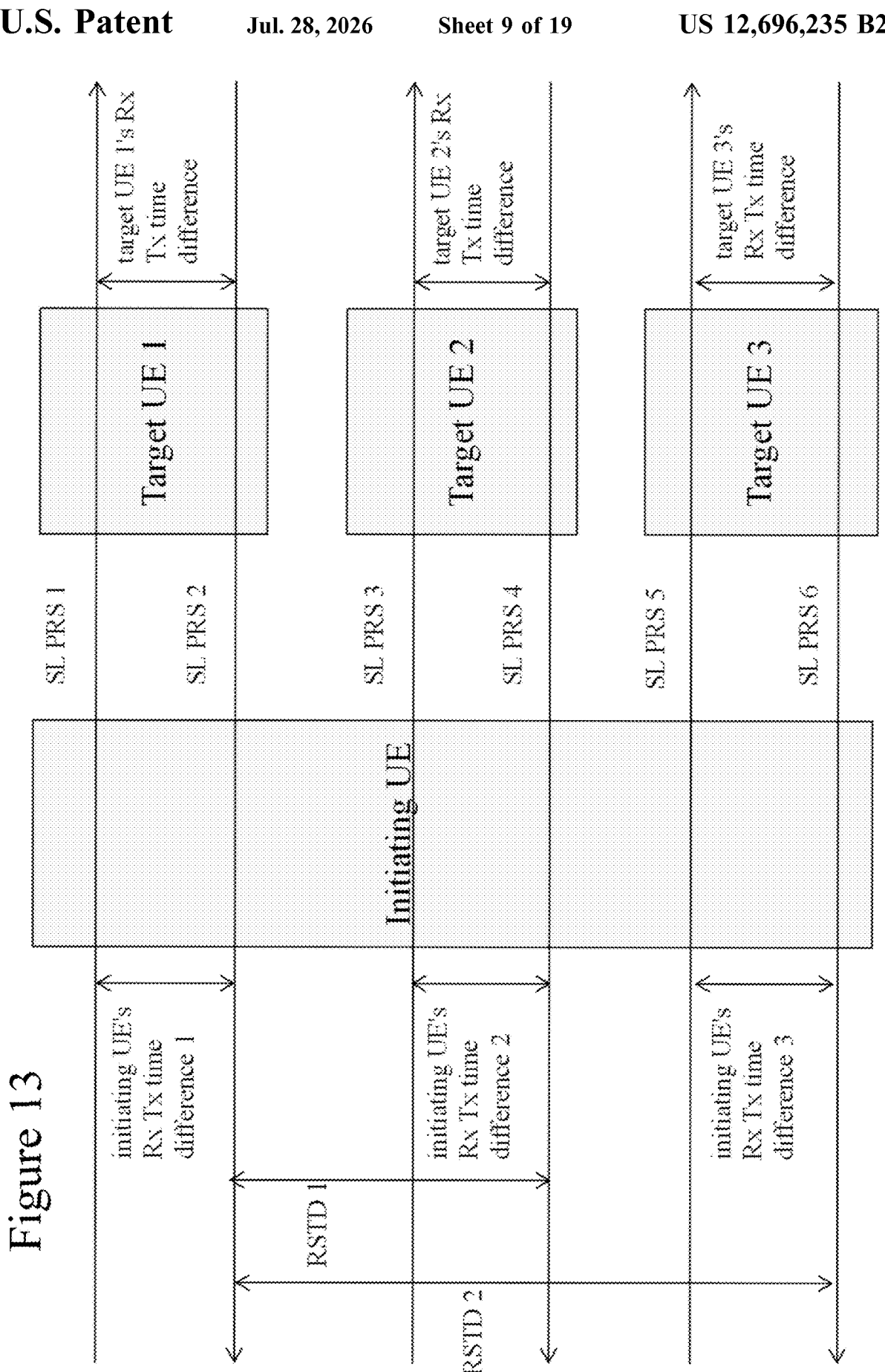
FIG. 13 shows an example of timing for sidelink positioning communications.

FIG. 13 shows an example of timing for sidelink positioning communications. The SL PRS can be sent periodical, semi-persistent or dynamic. In some embodiments, SL PRS can be configured with a period, for periodic SL PRS, when UE receives measurement request, UE may be ready to receive SL PRS. For semi-persistent SL PRS, lower layers can trigger some of the SL PRS transmission from the higher layer configuration. For a dynamic SL PRS, SCI can trigger dynamic SL PRS transmission.

Figure 14:
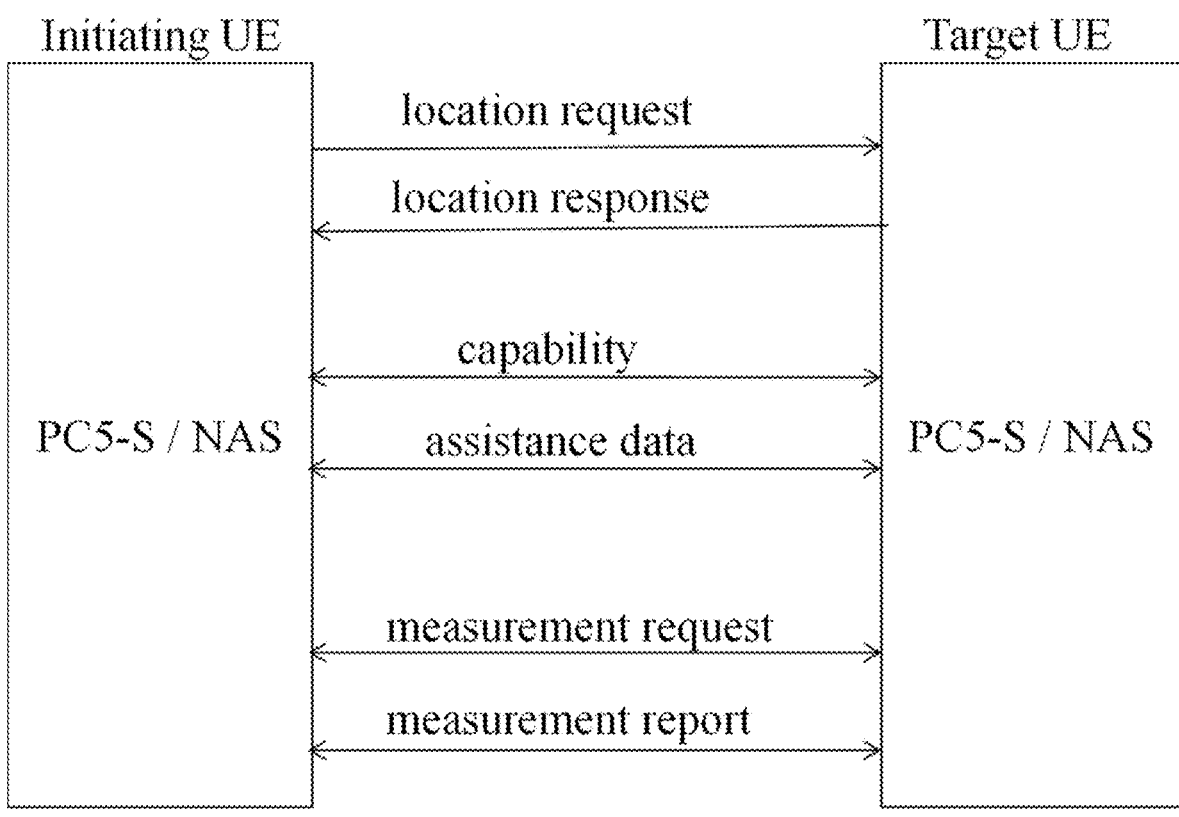
FIG. 14 shows an example of sidelink positioning communications with PC5 signaling.

FIG. 14 shows an example of sidelink positioning communications with PC5 signaling. In this example, all of the signaling shown in FIG. 6 is communicated via PC5-S, which may be through the NAS layer. This includes the location request, location response, capability, assistance data, measurement request, and measurement report. The PC5 signaling may be dedicated for SL positioning. In other words, the positioning function is performed in the NAS layer. The initiating UE may send SL positioning related control signaling via PC5 signaling in the NAS layer. The SL positioning related control signaling may be at least one of a UE location request, a UE location response, a sidelink capability request, a sidelink capability provision, a UE assistance data request, a UE assistance data provision, a SL measurement request, or a SL measurement report.

Figure 15:
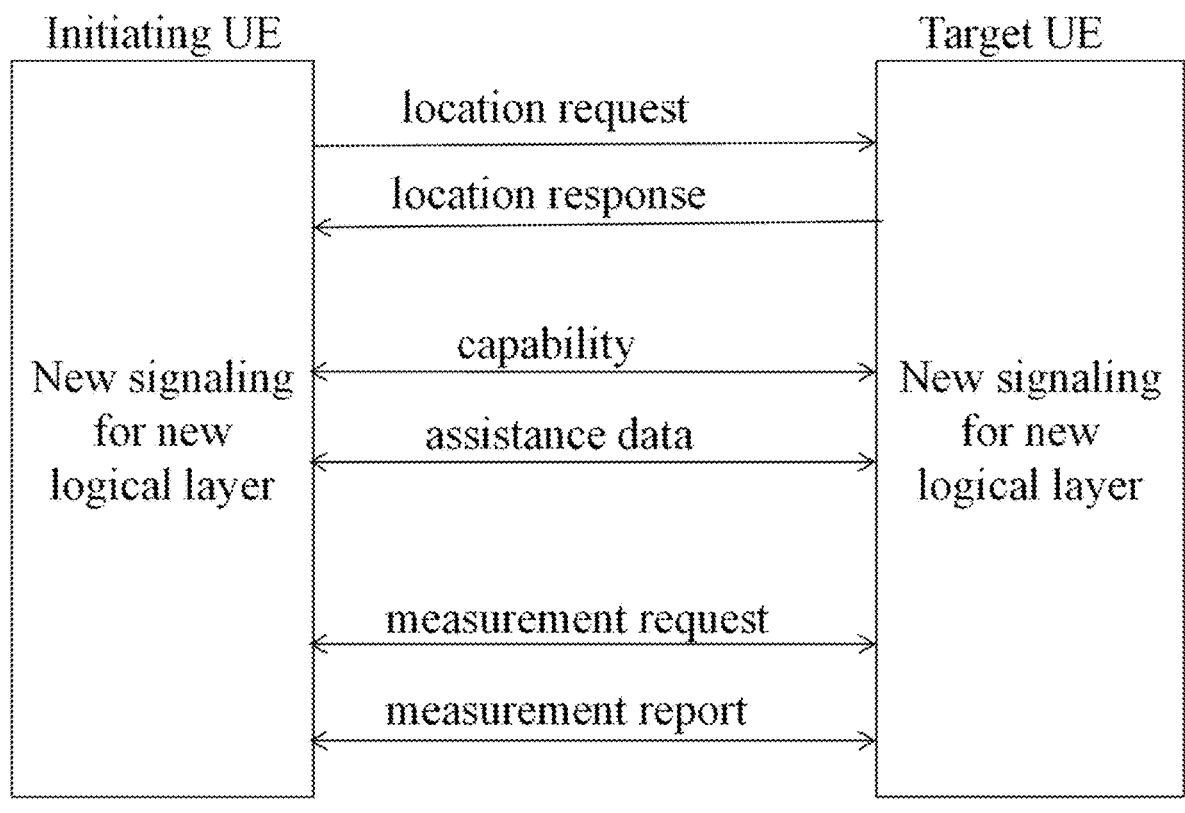
FIG. 15 shows an example of sidelink positioning communications at a new logical layer.

FIG. 15 shows an example of sidelink positioning communications at a new logical layer. In FIG. 15, all of the signaling shown in FIG. 6 is communicated via the new logical layer for sidelink positioning. This includes the location request, location response, capability, assistance data, measurement request, and measurement report. The new logical layer is introduced between PC5-S layer and PC5-RRC layer (NAS layer and AS layer) in one embodiment. In another embodiment, the new logical layer is parallel to the NAS layer or the RRC layer. In another embodiment, the new logical layer is included in the NAS layer. This embodiment shows all of the signaling from FIG. 6 being communicated via the new logical layer for sidelink positioning, but in other embodiments, only a subset of the signaling may be transmitted over the logical layer.

Figure 16:
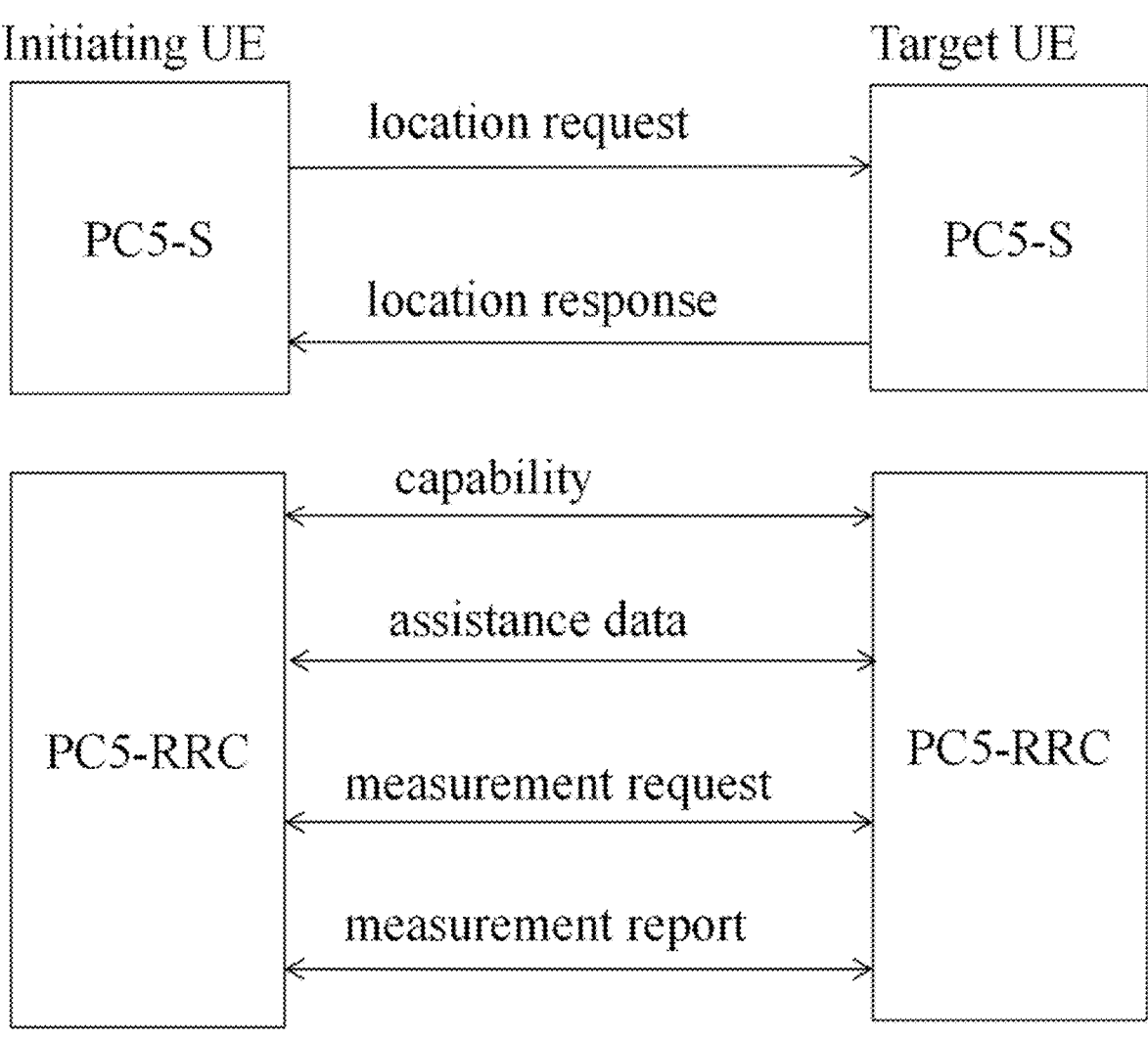
FIG. 16 shows an example of sidelink positioning communications with PC5 sidelink (PC5-S) signaling and PC5 radio resource control (RRC) signaling.

FIG. 16 shows an example of sidelink positioning communications with PC5 sidelink (PC5-S) signaling and PC5 radio resource control (RRC) signaling. In this example, a subset of the signals from FIG. 6 are transmitted via PC5-S signaling (over the NAS layer) and a subset of the signals from FIG. 6 are transmitted via PC5-RRC signaling (over the RRC layer). In this example, the location request an the location response are transmitted via PC5-S, while the other information is transmitted via PC5-RRC. This is just one example and other embodiments, show different information transmitted with different signaling over different layers.

The location request and location response are transmitted in PC5-S, while the capability, assistance data, measurement request, and measurement report are transmitted in PC5-RRC. The initiating UE is the UE wants to acquire its own location by sidelink positioning, and target UE(s) are the UE(s) that initiating UE transmits SL-PRS to/receives SL-PRS from. In this example, the initiating UE and target UE(s) may set up a unicast link via PC5-S signaling which includes the SL positioning request, after unicast link establishment, then PC5-RRC signaling is used to configure control information for SL positioning. When initiating UE is indicated by V2X application layer or network that it needs to initiate SL positioning, initiating UE may send a DIRECT LINK ESTABLISHMENT REQUEST message to multiple other target UE(s) for unicast link establishment. In the DIRECT LINK ESTABLISHMENT REQUEST message, except for the existing IEs, the initiating UE may also include at least one of the following:

a SL positioning specific V2X service identifier received from upper layer;

A request to perform SL positioning;

A request to receive SL PRS from other UE(s);

A request to transmit SL PRS to other UE(s);

A request to receive assistance data configuration from other UE(s);

A request to transmit assistance data configuration to other UE(s);

Required KPIs and positioning requirements including positioning accuracy, response time, horizontal accuracy, vertical accuracy, timing quality, etc.;

SL positioning method, such as: whether to measure single trip PRS and provide single trip measurements, or measure multiple trip PRS and provide round trip measurements, or measure SL PRS and DL PRS and provide general measurements, or measure SL PRS and UL SRS and provide general measurements, or measure RSTD, or measure AoA, or measure AoD.

Multiple UEs may receive the message, and if the target UE(s) is interested in this service type (SL positioning), the target UE(s) may create and send DIRECT LINK ESTABLISHMENT ACCEPT message to the initiating UE. Then the unicast links between UE pairs (e.g., one initiating UE and one or more target UEs) are established.

In another embodiment, initiating UE can send SL positioning related control signaling via PC5 signaling in the NAS layer. The initiating UE includes the above location request in a new IE in PRC5 signaling. This PC5 signaling can be transmitted before or after unicast link has established. This PC5 signaling can be transmitted via broadcast, groupcast or unicast.

The initiating UE and target UEs can interact their assistance data configuration and UE SL positioning related capability with each other via PC5-RRC message. UE SL positioning related capability interaction includes at least one of the sidelink related capability request and the sidelink related capability response, and can contain in UECapabilityEnquirySidelink and UECapabilityInformationSidelink, respectively. The UE assistance data configuration interaction includes at least one of assistance data request and assistance data response/provision, and may be included in an RRCReconfigurationSidelink. In other embodiments, the IEs can be introduced in PC5-RRC signaling to include the assistance data request and assistance data response/provision, respectively. It may be used in the example that the initiating UE and the target UEs create their assistance data configurations independently (self-configuration/self-generated AD).

In another embodiment, if the initiating UE and target UEs already get the assistance data configuration by pre-configuration or by network indicating (e.g. the same or different assistance data configurations), initiating UE and target UEs are allowed to modify the assistance data configuration via PC5-RRC signaling. For example, configuring SL UE capabilities and assistance data configurations of SL positioning in UECapabilityEnquirySidelink, UECapabilityInformationSidelink and/or RRCReconfigurationSidelink. In another example, some of the UE capabilities or some of the assistance data configurations that are different with pre-configuration or network indicating may be included in UECapabilityEnquirySidelink, UECapabilityInformationSidelink and/or RRCReconfigurationSidelink. In another example, SL UE capabilities and/or assistance data configurations (or some of the UE capabilities or some of the assistance data configurations that are different with pre-configuration or network indicating) may include new PC5-RRC parameters and broadcast or groupcast in the region.

Figure 17:
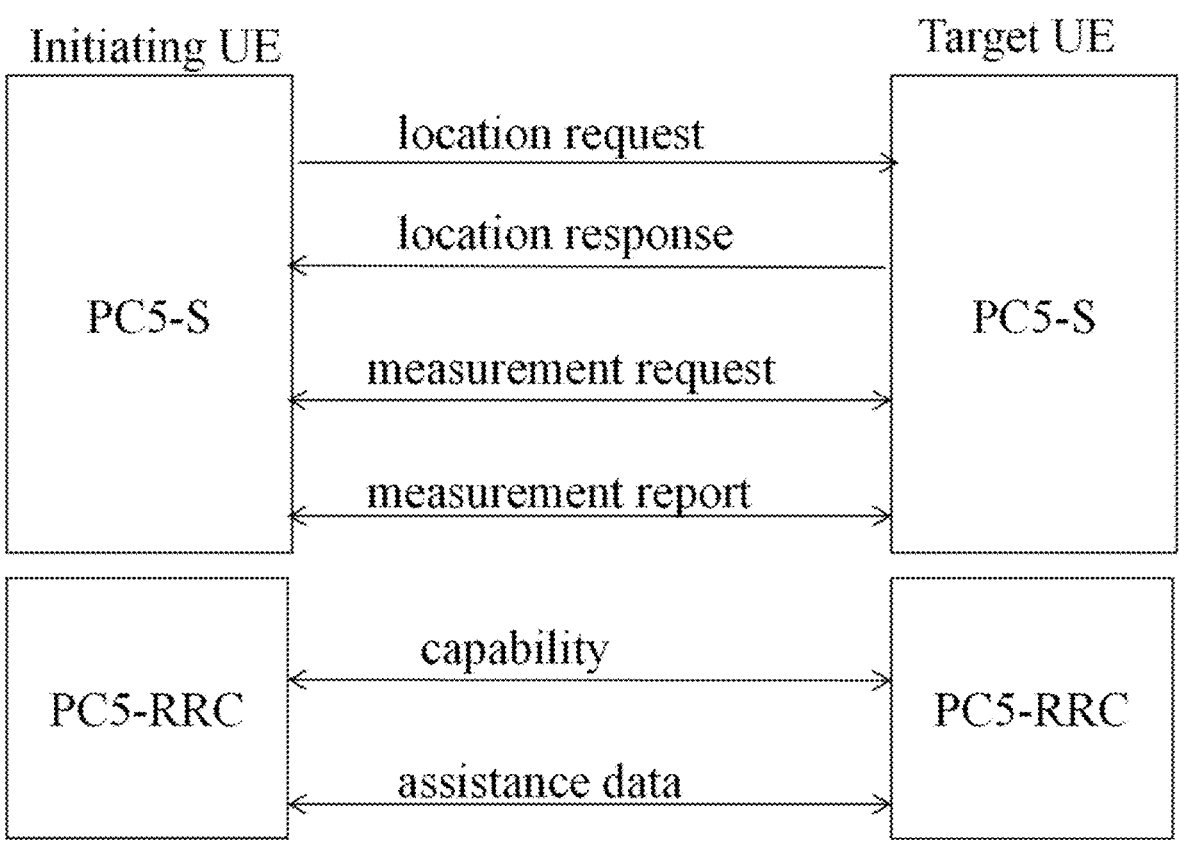
FIG. 17 shows another example of sidelink positioning communications with PC5 sidelink (PC5-S) signaling and PC5 radio resource control (RRC) signaling.

FIG. 17 shows another example of sidelink positioning communications with PC5 sidelink (PC5-S) signaling and PC5 radio resource control (RRC) signaling. In this example, the location request, location response, measurement request, and measurement response are transmitted via PC5-S signaling over the NAS layer, while the capability and assistance data are transmitted via PC5-RRC signaling over the RRC layer. The measurement request and measurement report can be generated and/or processed at NAS layer. There may be a new IEs in PC5 signaling to indicate measurement request and measurement report. In this example, the initiating UE and target UE(s) may set up unicast link via PC5-S signaling which contains SL positioning request, after unicast link establishment, then PC5-RRC signaling is used to configure control information for SL positioning. When initiating UE is indicated by V2X application layer that it needs to initiate SL positioning, the initiating UE may send a DIRECT LINK ESTABLISHMENT REQUEST message to multiple other target UE(s) for unicast link establishment. In the DIRECT LINK ESTABLISHMENT REQUEST message, initiating UE should include at least one of the following:

a SL positioning specific V2X service identifier received from upper layer;
  A request to perform SL positioning;
  A request to receive SL PRS from other UE(s);
  A request to transmit SL PRS to other UE(s);
  A request to receive assistance data configuration from other UE(s);
  A request to transmit assistance data configuration to other UE(s);
  Required KPIs and positioning requirements, for example, positioning accuracy, response time, horizontal Accuracy, vertical Accuracy, timing quality, etc.;
  Required SL positioning method, such as: whether to measure single trip PRS and provide single trip measurements, or measure multiple trip PRS and provide round trip measurements, or measure SL PRS and DL PRS and provide general measurements, or measure SL PRS and UL SRS and provide general measurements, or measure RSTD, or measure AoA, or measure AoD;

Multiple UEs may receive the message, and if the target UE(s) is interested in this service type, the target UE(s) will create and send DIRECT LINK ESTABLISHMENT ACCEPT message to the initiating UE. The unicast links between UE pairs (one initiating UE and one or more target UEs) are established. In another example, the initiating UE can send SL positioning related control signaling via PC5 signaling in NAS layer. initiating UE includes the above location request in a new IE in PRC5 signaling. These PC5 signaling can be transmitted before or after unicast link has been established. These PC5 signaling can be transmitted via broadcast or groupcast, or unicast. In alternative embodiments, any of the signaling may be conveyed by the new logical layer rather than by PC5 signaling or PC5-RRC signaling.

Figure 18:
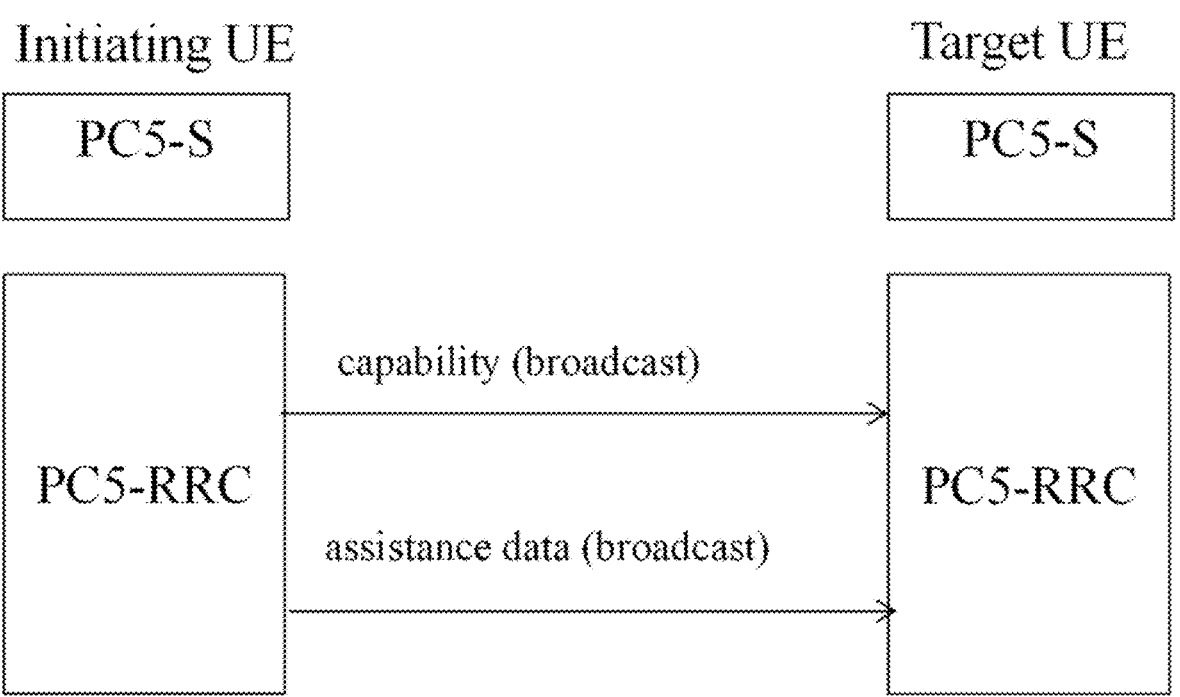
FIG. 18 shows an example of sidelink positioning communications with PC5 radio resource control (RRC) signaling.

FIG. 18 shows an example of sidelink positioning communications with PC5 radio resource control (RRC) signaling. Current PC5-RRC signaling may include MeasurementReportSidelink, RRCReconfigurationSidelink, RRCReconfigurationCompleteSidelink, RRCReconfigurationFailureSidelink, UECapabilityEnquirySidelink, and/or UECapabilityInformationSidelink. These PC5-RRC signaling may be used for unicast link and may only be transmitted after PC5-S has established unicast link. When these PC5-RRC signaling pass down to the lower layer for transmission, they may be conveyed in PSSCH and the cast type in SCI will be set to unicast.

To reduce positioning latency, there may be new IEs in PC5-RRC signaling to broadcast/groupcast SL positioning related information. There may be broadcast/groupcast signaling in RRC layer. The broadcast/groupcast PC5-RRC signaling may be transmitted without PC5-S unicast link establishment, or even if when unicast link has been established, one UE can still broadcast/groupcast some of the PC5-RRC signaling to other UEs. With these PC5-RRC signals new IEs via of PC5-RRC signaling may be broadcast and/or groupcast which is passed to lower layer for transmission. They can also be conveyed in PSSCH and the cast type in SCI can be set to broadcast or groupcast. A new SCI format may be introduced to schedule the PSSCH containing broadcast/groupcast PC5-RRC signaling.

The above SL positioning related information can be at least one of location request, location response, UE sidelink positioning related capability request, UE sidelink positioning related capability response/provision, sidelink assistance data information request, sidelink assistance data information response/provision, measurement request, measurement report/response. The SL assistance data in RRC signaling (or SL PRS configuration, for example PRS periodicity) can be delta SL assistance data, delta SL assistance data (or SL PRS configuration, for example PRS periodicity) is a modification of pre-configured assistance data (or SL PRS configuration, for example PRS periodicity). Alternatively, the above SL positioning related information can be determined or generated at NAS or application layer and passed to RRC layer to transmit.

Figure 19:
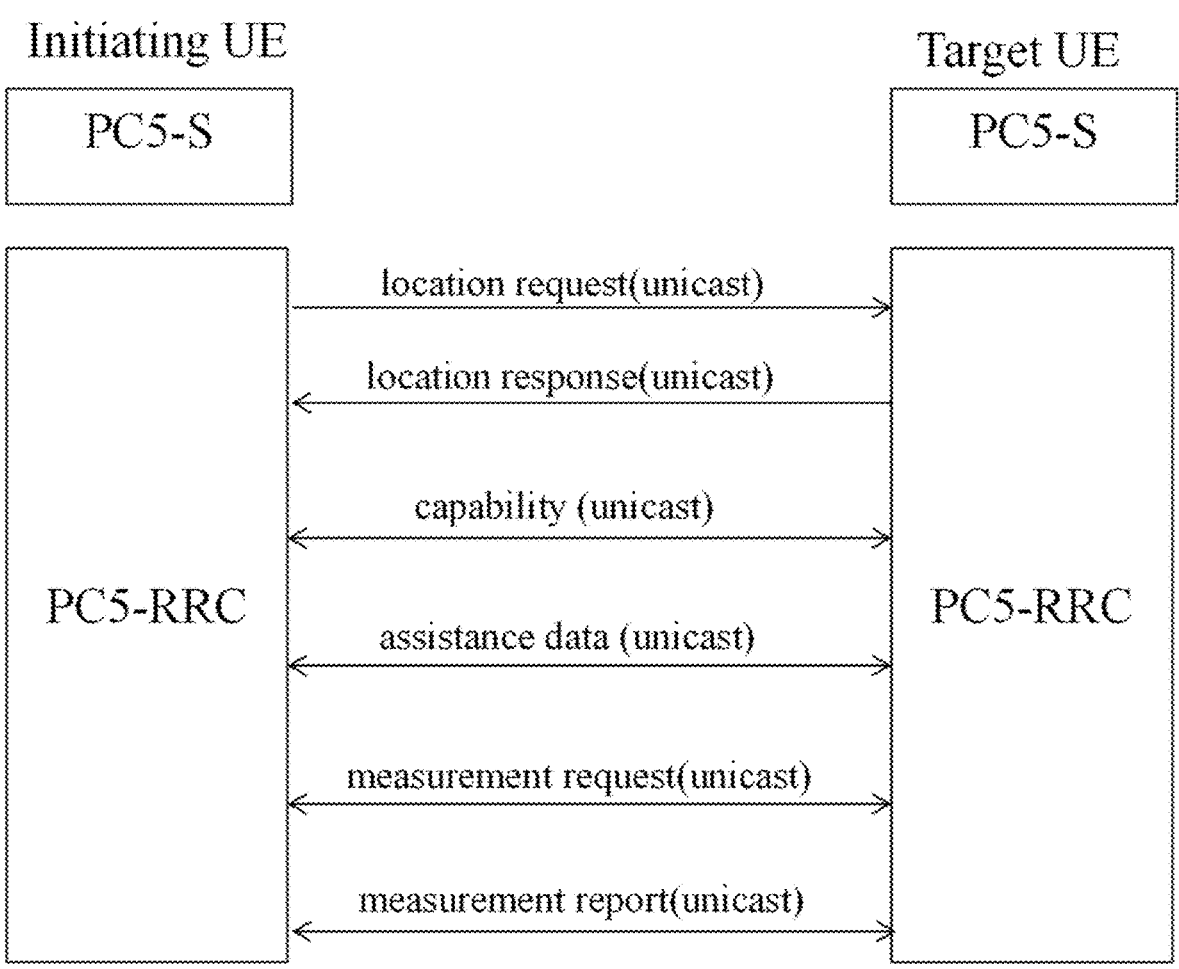
FIG. 19 shows another example of sidelink positioning communications with PC5 radio resource control (RRC) signaling.

FIG. 19 shows another example of sidelink positioning communications with PC5 radio resource control (RRC) signaling. In this example, the location request, location response, measurement request, and measurement response, capability, and assistance data are all transmitted via PC5-RRC signaling over the RRC layer. In this embodiment, the initiating UE and the target UEs have already set up multiple unicast links for transmitting PC5-RRC signaling.

If upper layer (AF, application layer, application server, V2X layer, or NAS layer) has a location request via positioning or SL positioning, the upper layer may pass the request to UE's RRC layer. A new PC5-RRC signaling may be introduced to include the location request. Also, the initiating UE and the target UEs can interact their assistance data configuration and UE SL positioning related capability with each other via unicast PC5-RRC message. UE SL positioning related capability interaction may include at least one of the sidelink related capability request and the sidelink related capability response, and may be included in UECapabilityEnquirySidelink and UECapabilityInformationSidelink, respectively. UE assistance data configuration interaction includes at least one of assistance data request and assistance data response, and can contain in RRCReconfigurationSidelink. The new IEs can be introduced in PC5-RRC signaling to include the assistance data request and assistance data response/provision, respectively. It may be used when the initiating UE and target UEs create their assistance data configurations independently (self-configuration/self-generated AD). It may be used when initiating UE and target UEs create their assistance data configurations independently.

In another embodiment, if the initiating UE and the target UEs already get the assistance data configuration by pre-configuration or by network indicating (the same or different assistance data configurations), the initiating UE and target UEs may be allowed to modify the assistance data configuration via PC5-RRC unicast signaling. For example, configure SL UE capabilities and assistance data configurations of SL positioning in UECapabilityEnquirySidelink, UECapabilityInformationSidelink and/or RRCReconfigurationSidelink. In another example, some of the UE capabilities or some of the assistance data configurations that are different with pre-configuration or network indicating may be included in UECapabilityEnquirySidelink, UECapabilityInformationSidelink and/or RRCReconfigurationSidelink. In another example, SL UE capabilities and/or assistance data configurations (or some of the UE capabilities or some of the assistance data configurations that are different with preconfiguration or network indicating) may be included in new PC5-RRC parameters and broadcast or groupcast in the region.

Alternatively, the above location request, UE sidelink capability, and/or UE SL assistance data can be determined or generated at NAS or application layer and passed to RRC layer to transmit. The measurement configuration request and measurement report can be processed in the RRC layer, the NAS layer, or the new layer. The measurement request and measurement report can be new IEs introduced in the RRC layer, the NAS layer, and/or the new layer. The measurement request may be included in RRCReconfigurationSidelink in the RRC layer.

Figure 20:
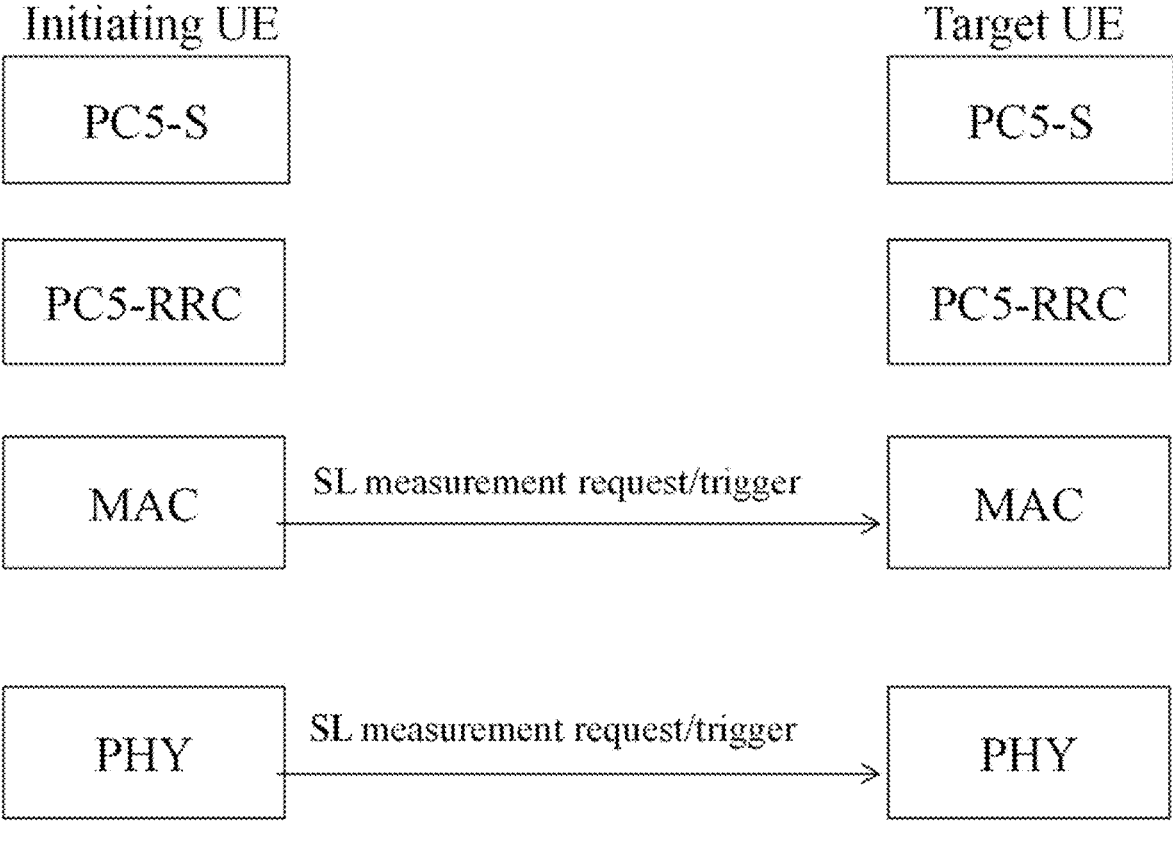
FIG. 20 shows an example of sidelink positioning communications for a measurement.

FIG. 20 shows an example of sidelink positioning communications for a measurement. The sidelink (SL) measurement request or trigger may be at the MAC layer of the physical (PHY) layer. The measurement request (PRS activation/deactivation/PRS request) may be in the SCI/MACCE. Regardless of which layer the location request is in, the capability and assistance data are interacted, as to SL measurement request/trigger. In one embodiment, the lower layer(s) trigger. The UE may be pre-configured or networkindicated one or more assistance data configurations. One assistance data configuration can also contain one or more SL PRS configurations. There may be no assistance data configuration, only one or more SL PRS configurations will be provided by upper layers. When PC5-RRC signaling configures assistance data configurations/information or SL PRS configurations and passes it to lower layer for transmission, the assistance data configurations or SL PRS configurations are visible at lower layer. The lower layer may modify/add/delete the SL assistance data configurations or SL PRS configurations that upper layer provides, and lower layer can also trigger SL PRS transmission or trigger SL positioning according to SL PRS configurations that upper layer provides. The lower layer can be MAC layer or PHY layer. Specifically, the layers may be the MAC-CE or SCI (first stage SCI or second stage SCI) and the change or trigger content may include:

1) Selected SL PRS resource ID/SL PRS resource set ID in a assistance data configuration or a SL PRS configuration to indicate the initiating UE may send the selected PRSs. If the SCI or MAC CE containing this is sent, initiating UE should start to send corresponding SL PRSs; if the SCI or MAC CE may include this is received by other target UEs, other target UEs should start to receive corresponding SL PRSs;

2) Selected SL PRS resource ID/SL PRS resource set ID in a assistance data configuration or a SL PRS configuration to indicate the PRSs that the initiating UE wishes to receive from other target UEs. If the SCI or MAC CE including this is sent, the initiating UE should start to receive corresponding SL PRSs; if the SCI or MAC CE including this is received by other target UEs, the other target UEs should start to send the corresponding SL PRS; or 3) Deleted SL PRS resource ID/SL PRS resource set ID in an assistance data configuration or a SL PRS configuration;

4) Trigger request to initiating SL PRS transmission according to the assistance data configuration or the SL PRS configuration that upper layer provides; or 5) Changed PRS features. For example, SL-PRS resource ID/SL-PRS resource set ID/assistance data configuration ID/SL PRS configuration ID together with at least one of the following can be carried in media access control control element (MAC-CE), or SCI: SL-PRS priority, SL-PRS periodicity, SL-PRS resource offset, SL-PRS resource repetition factor, SL-PRS resource time gap, SL-PRS muting pattern, SL-PRS resource power, SL-PRS sequence ID, SL-PRS comb size, SLPRS SCS, SL-PRS RB set, response time. The above IEs may be the changed IE, compared with the preconfiguration or network indications.

In another embodiment, the NAS or PC5-RRC layer triggers. PC5 signaling or PC5-RRC signaling may also indicates other UEs to perform SL PRS measurements. This may include new PC5 signaling to indicate SL positioning measurement request.

In another embodiment, the new layer triggers. The new logical layer may be introduced between PC5-S layer and PC5-RRC layer (NAS layer and AS layer), or parallel to NAS layer or RRC layer. The new logical layer may be part of the NAS layer. SL positioning measurement request can be conveyed and transferred by this new layer.

For the sidelink (SL) measurement report, this may be reported to the RRC layer. A location estimate may be done in RRC layer, or RRC layer passes the measurement results to upper layers (NAS or application layer) to calculate location estimate. For the sidelink (SL) measurement report, this may be reported to NAS layer or application layer. After UEs perform SL PRS measurements, UEs may interact SL PRS measurement report. The measurement report is passed from PHY layer to NAS layer or application layer to calculate location. There may be new PC5 signaling to contain SL positioning measurement report. For the sidelink (SL) measurement report, this may be reported to the new layer. The SL positioning measurement report can be conveyed and transferred by this new layer.

Figure 21:
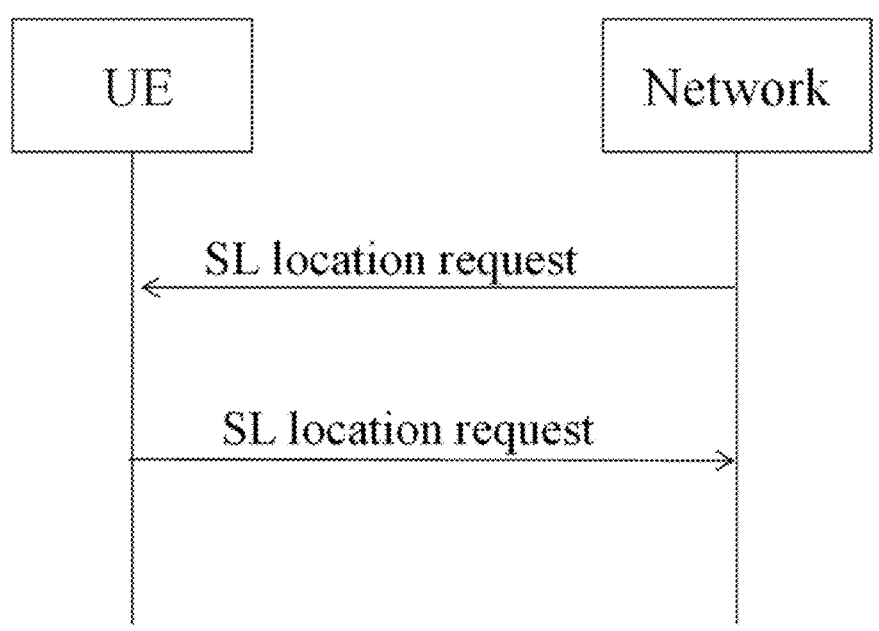
FIG. 21 shows an example of sidelink location communications.

FIG. 21 shows an example of sidelink location communications. FIG. 21 illustrates the UE communicating with the network, which may include the components described with respect to FIG. 5. The network node provides a sidelink (SL) request to the UE. The UE provides a SL location response to the network. There may be a target UE (TU) and a peer UE (PU). There may be four types of communication:
TU in coverage, PU out of coverage: TU interacts with NW via uu interface;
TU in coverage, PU in coverage: TU and PU interact with NW via uu interface;
TU and PU out of coverage: TU and PU interact with each other via PC5 interface; or
TU out of coverage, PU in coverage: PU interacts with NW via uu interface.

For UEs interacting with NW, there may be several kinds of interactions. For in-coverage/partial coverage UE, the NW is enabled to send location request to UE, the indicating UE performs the SL positioning. The NW can be LMF, AMF, NG-RAN node, V2X application server at NW, TRP, gNB, and/or ng-eNB as in FIG. 5.

Figure 22:
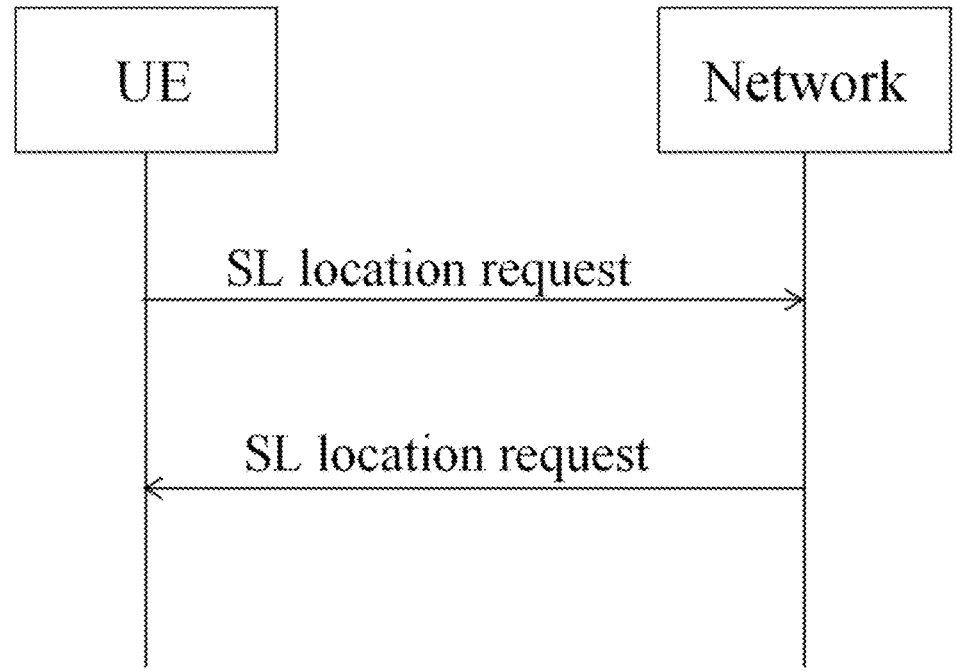
FIG. 22 shows another example of sidelink location communications.

FIG. 22 shows another example of sidelink location communications. FIG. 22 illustrates the UE communicating with the network, which may include the components described with respect to FIG. 5. The network node receives a sidelink (SL) request from the UE. The network node provides an SL location response to the UE. There may be a target UE (TU) and a peer UE (PU). For in coverage/partial coverage UE, the UE is enabled to send a location request to the NW, and to request the NW allocates/indicates assistance information.

Figure 23:
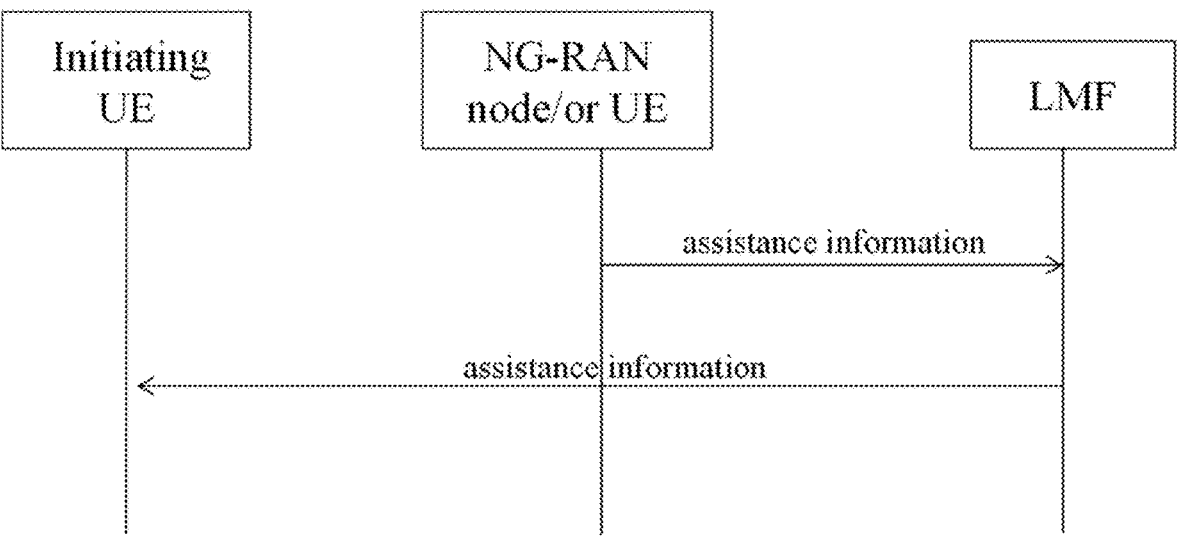
FIG. 23 shows an example of assistance information communications.

FIG. 23 shows an example of assistance information communications. One or more NG-RAN node(s) or UEs are enabled to report its assistance information to the LMF, and/or enable NW LMF to send available assistance information to in-coverage/partial coverage UE. As in FIG. 6, the assistance information may include SL assistance data configuration for the UE, including SL PRS configurations the UE will transmit; SL assistance data configuration of other peer UEs, including peer UE's know location and/or peer UE's SL PRS configuration; or sidelink related capability of other peer UEs.

Figure 24:
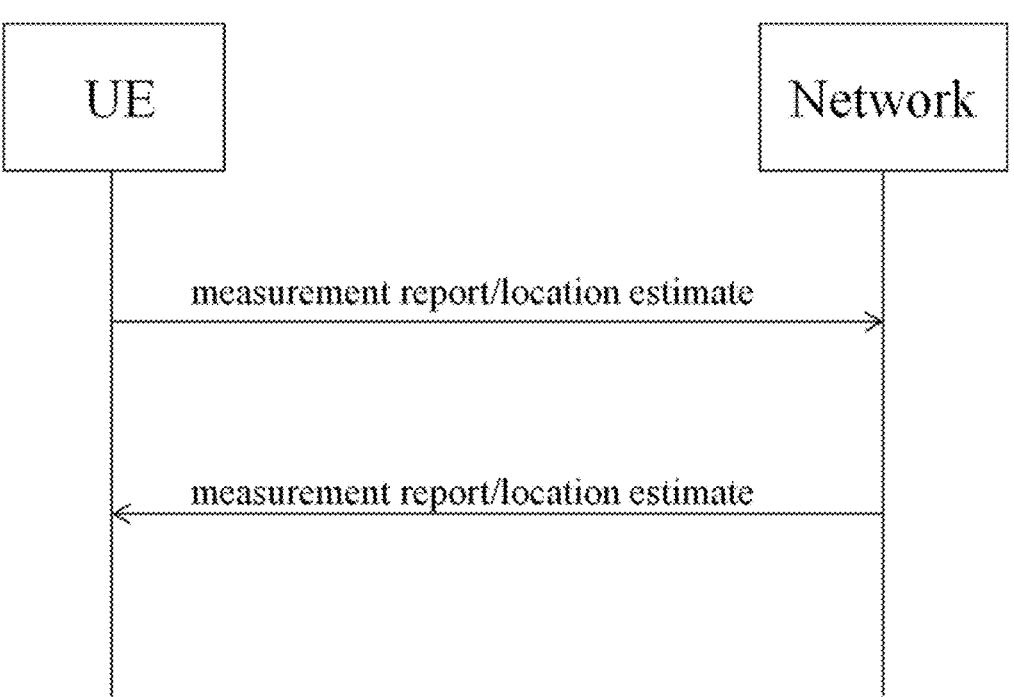
FIG. 24 shows an example measurement report or location estimate communications.

FIG. 24 shows an example measurement report or location estimate communications. FIG. 24 illustrates the UE communicating with the network, which may include the components described with respect to FIG. 5. In this embodiment, in coverage/partial coverage is enabled for the UE to send the measurement report and/or location estimate to the NW. The NW is enabled send measurement report and/or location estimate to the in coverage/partial coverage UE. The in coverage/partial coverage UE that can send measurement report is the initiating UE and corresponding target UEs. The in coverage/partial coverage UE that can send the location estimate is the initiating UE with location calculating capability and/or target UEs with location calculating capability. The initiating UE may have the calculating capability and can perform SL PRS measurements and calculate location by itself. The initiating UE may not have the calculating capability, while the other UE near the initiating UE may have the calculating capability. The network (NG-RAN node or LMF) may have the calculating capability.

In an alternative embodiment, there may be an allowance of in coverage/partial coverage UE to perform uu-based positioning as well as SL positioning, in coverage/partial coverage UE can be indicated by NW to perform uu-based PRS measurements and SL PRS measurements simultaneously. Uu-based positioning may be specified in R16 and R17, RAT-dependent/RAT-independent positioning methods between UE-NG-RAN nodes-LMF. The signaling flow may include for SL positioning measurements, a transfer can be at least one of the following: from peer UEs to target UE, from target UE to peer UE (calculating UE), from target UE to NG-RAN node, from target UE to LMF, from peer UE to NG-RAN node, from peer UE to LMF. In another embodiment, for SL positioning location estimate transfer may be from target UE to LMF, from peer UE to LMF, from peer UE to target UE then to LMF, from peer UE to target UE, or from LMF to target UE.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless communication, comprising:
receiving, by a user equipment (UE), sidelink positioning information via a first signaling, wherein the first signaling comprises a signaling generated at a new logical layer, the new logical layer differs from non-access stratum (NAS) layer, radio resource control (RRC) layer, application layer, medium access control (MAC) layer, and physical layer (PHY) layer, and the first signaling differs from PC5-S signaling, PC5-RRC signaling, NAS signaling, sidelink control information (SCI) signaling, and RRC signaling, and wherein the sidelink positioning information comprises at least one of a sidelink positioning capability request, a sidelink positioning capability response, a sidelink assistance data request, a sidelink assistance data response, a sidelink measurement request, or a sidelink measurement report.

2. The method of claim 1, wherein the sidelink positioning information is received from another node, the another node comprising at least one of a network node or another UE; and wherein the network node comprises at least one of a location management function (LMF) or a gNB.

3. The method of claim 1, wherein the sidelink positioning information is received from a network node, the method further comprising:
receiving, from the network node, at least one of sidelink assistance data for the UE, or sidelink assistance data for one or more associated peer UEs.

4. The method of claim 1, wherein the new logic layer is between the application layer and the NAS layer.

5. The method of claim 1, wherein the received sidelink positioning information comprises a request to transmit a sidelink positioning reference signal (SL-PRS).

6. The method of claim 1, wherein the received sidelink positioning information comprises the sidelink positioning capability response, the sidelink positioning capability response comprises an indication of whether a UE sending the sidelink positioning capability response can measure at least one of SL-PRS reference signal received power (SL-PRS-RSRP), received power per path of SL-PRS reference signal (SL-PRS-RSRPP), SL-PRS reference signal reference time of arrival (SL-PRS-RTOA), or SL-PRS reference signal time difference (SL-PRS-RSTD).

7. The method of claim 1, wherein the received sidelink positioning information comprises the sidelink assistance data request, the sidelink assistance data request comprising at least one of requesting assistance data of UE's location, or requesting assistance data of UE's synchronization information.

8. The method of claim 1, wherein the received sidelink positioning information comprises the sidelink assistance data response, the sidelink assistance data response comprising at least one of assistance data for calculating sidelink positioning estimates, a sidelink positioning reference signal (SL-PRS) configuration, or an identifier for identifying an SL-PRS configuration; and wherein
the assistance data for calculating sidelink positioning estimates comprises at least one of a UE's location, or a UE's synchronization source, or a UE's synchronization reference;
the SL-PRS configuration comprises at least one of a period of SL-PRS resource, a number of symbols that a SL-PRS occupied in a slot, start symbol of SL-PRS in a slot, or SL-PRS resource frequency location, bandwidth, or comb size; and
the identifier for identifying the SL-PRS configuration comprises a UE application layer ID.

9. The method of claim 1, wherein the received sidelink positioning information comprises the sidelink measurement request, the sidelink measurement request comprising an SL-PRS resource identifier to indicate SL-PRS resource for reception.

10. The method of claim 1, wherein the received sidelink positioning information comprises the sidelink measurement report, the sidelink measurement report comprising at least one of a sidelink positioning reference signal (SL-PRS) reference signal received power (RSRP), received power per path of SL-PRS reference signal (SL-PRS-RSRPP), an SL-PRS time of arrival (TOA), an SL-PRS Rx-Tx time difference, an SL-PRS reference signal time difference (RSTD), a time stamp for a measurement, a time quality, a measurement quality, an identifier of measured SL-PRS, or an identifier of measured UE.

11. The method of claim 1, wherein the sidelink positioning information comprises an SL-PRS priority and an SL-PRS periodicity.

12. The method of claim 1, wherein the sidelink positioning information comprises an information element for indicating that a SL-PRS needs to be measured and a measurement configuration.

13. The method of claim 1, wherein the sidelink positioning information comprises an information element for indicating a SL-PRS measurement result, wherein the SL-PRS measurement result includes a RSRP of the SL-PRS.

14. A method for wireless communication, comprising:
sending, by a network node, sidelink positioning information via a first signaling, wherein the first signaling comprises signaling generated at a new logical layer, the new logical layer differs from non-access stratum (NAS) layer, radio resource control (RRC) layer, application layer, medium access control (MAC) layer, and physical layer (PHY) layer, and the first signaling differs from PC5-S signaling, PC5-RRC signaling, NAS signaling, sidelink control information (SCI) signaling, and RRC signaling, and wherein the sidelink positioning information comprises at least one of a sidelink positioning capability request, a sidelink positioning capability response, a sidelink assistance data request, a sidelink assistance data response, a sidelink measurement request, or a sidelink measurement report.

15. A user equipment (UE), comprising a memory for storing computer instructions and at least one processor configured to read the computer instructions from the memory to implement:

receiving sidelink positioning information via a first signaling, wherein the first signaling comprises a signaling generated at a new logical layer, the new logical layer differs from non-access stratum (NAS) layer, radio resource control (RRC) layer, application layer, medium access control (MAC) layer, and physical layer (PHY) layer, and the first signaling differs from PC5-S signaling, PC5-RRC signaling, NAS signaling, sidelink control information (SCI) signaling, and RRC signaling, and wherein the sidelink positioning information comprises at least one of a sidelink positioning capability request, a sidelink positioning capability response, a sidelink assistance data request, a sidelink assistance data response, a sidelink measurement request, or a sidelink measurement report.

16. The UE of claim 15, wherein the sidelink positioning information is received from another node, the another node comprising at least one of a network node or another UE; and wherein the network node comprises at least one of a location management function (LMF) or a gNB.

17. The UE of claim 15, wherein the sidelink positioning information is received from a network node, the at least one processor is configured to read the computer instructions from the memory to further implement:

receiving, from the network node, at least one of sidelink assistance data for the UE, or sidelink assistance data for one or more associated peer UEs.

18. The UE of claim 15, wherein the new logic layer is between the application layer and the NAS layer.

19. The UE of claim 15, wherein the received sidelink positioning information comprises a request to transmit a sidelink positioning reference signal (SL-PRS).

20. The UE of claim 15, wherein the received sidelink positioning information comprises the sidelink positioning capability response, the sidelink positioning capability response comprises an indication of whether a UE sending the sidelink positioning capability response can measure at least one of SL-PRS reference signal received power (SL-PRS-RSRP), received power per path of SL-PRS reference signal (SL-PRS-RSRPP), SL-PRS reference signal reference time of arrival (SL-PRS-RTOA), or SL-PRS reference signal time difference (SL-PRS-RSTD).

* * * * *